(12) United States Patent
Maze et al.

(10) Patent No.: US 10,645,379 B2
(45) Date of Patent: May 5, 2020

(54) IMAGE DATA ENCAPSULATION

(71) Applicant: CANON KABUSHIKI KAISHA, Tokyo (JP)

(72) Inventors: Frédéric Maze, Langan (FR); Franck Denoual, Saint Domineuc (FR); Naël Ouedraogo, Maure de Bretagne (FR); Jean Le Feuvre, Cachan (FR); Cyril Concolato, Combs la Ville (FR)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 15/574,119

(22) PCT Filed: Jun. 8, 2016

(86) PCT No.: PCT/EP2016/063035
§ 371 (c)(1),
(2) Date: Nov. 14, 2017

(87) PCT Pub. No.: WO2016/202664
PCT Pub. Date: Dec. 22, 2016

(65) Prior Publication Data
US 2018/0352219 A1    Dec. 6, 2018

(30) Foreign Application Priority Data
Jun. 16, 2015    (GB) .................................. 1510608.1

(51) Int. Cl.
*H04N 19/102* (2014.01)
*H04N 19/172* (2014.01)
(Continued)

(52) U.S. Cl.
CPC ........... *H04N 19/102* (2014.11); *H04N 19/17* (2014.11); *H04N 19/176* (2014.11); *H04N 19/46* (2014.11);
(Continued)

(58) Field of Classification Search
CPC .... H04N 19/102; H04N 19/17; H04N 19/176; H04N 19/46; H04N 21/8153;
(Continued)

(56) References Cited

U.S. PATENT DOCUMENTS

| 6,597,471 B1 * | 7/2003 | Yoshikawa | ........... G06F 3/1208 |
| | | | 358/1.16 |
| 9,756,268 B2 * | 9/2017 | Desai | ................... H04N 5/3692 |

(Continued)

FOREIGN PATENT DOCUMENTS

| CN | 102209177 A | 10/2011 |
| EP | 3092772 A1 | 11/2016 |

(Continued)

OTHER PUBLICATIONS

Ampawasiri et al. ("A Study of High Efficiency Video Coding File Format," International Conference on IT Convergence and Security (ICITCS), Oct. 28-30, 2014) (Year: 2014).*

(Continued)

*Primary Examiner* — Yubin Hung
(74) *Attorney, Agent, or Firm* — Canon U.S.A., Inc. I.P. Division

(57) ABSTRACT

A method of encapsulating an encoded bitstream representing one or more images, the encapsulated bitstream comprising a data part and a metadata part. The method includes providing image item information identifying a portion of the data part representing a sub-image or an image of a single image and/or a set of single images; providing image description information comprising parameters including display parameters and/or transformation operators relating to one or more images and outputting said bitstream together with said provided information as an encapsulated data file. Said image item information comprises one or more properties including at least part of the image description infor- (Continued)

mation dedicated to the considered sub-image or single image or set of single images, said image description information being defined in one or more boxes.

19 Claims, 9 Drawing Sheets

(51) Int. Cl.

| | | |
|---|---|---|
| *H04N 21/84* | (2011.01) | |
| *H04N 21/854* | (2011.01) | |
| *H04N 19/46* | (2014.01) | |
| *H04N 21/845* | (2011.01) | |
| *H04N 19/17* | (2014.01) | |
| *H04N 19/176* | (2014.01) | |
| *H04N 21/81* | (2011.01) | |

(52) U.S. Cl.
CPC ......... *H04N 21/8153* (2013.01); *H04N 21/84* (2013.01); *H04N 21/8455* (2013.01); *H04N 21/85406* (2013.01); *H04N 19/172* (2014.11)

(58) Field of Classification Search
CPC ............... H04N 21/84; H04N 21/8455; H04N 21/85406; H04N 19/172
See application file for complete search history.

(56) References Cited

U.S. PATENT DOCUMENTS

| | | | | |
|---|---|---|---|---|
| 9,965,824 | B2* | 5/2018 | Zhu | H04N 5/91 |
| 2002/0120596 | A1* | 8/2002 | Gershoff | G06F 16/40 |
| 2004/0022453 | A1* | 2/2004 | Kusama | G06T 11/00 382/284 |
| 2005/0228753 | A1* | 10/2005 | Viger | G06F 21/645 705/51 |
| 2007/0186005 | A1 | 8/2007 | Vidya et al. | |
| 2009/0172011 | A1* | 7/2009 | Onomura | H04N 5/772 |
| 2012/0233345 | A1 | 9/2012 | Hannuksela | |
| 2013/0148893 | A1* | 6/2013 | Markham | G06K 9/3241 382/190 |
| 2013/0195205 | A1* | 8/2013 | Wang | H04N 19/70 375/240.26 |
| 2014/0098868 | A1 | 4/2014 | Wang | |
| 2014/0218565 | A1 | 8/2014 | Miyoshi et al. | |
| 2015/0110473 | A1 | 4/2015 | Wang et al. | |
| 2015/0156501 | A1 | 6/2015 | Hannuksela | |

FOREIGN PATENT DOCUMENTS

| | | |
|---|---|---|
| GB | 2524599 A | 9/2015 |
| GB | 2524726 A | 10/2015 |
| KR | 10-2008-0048054 A | 5/2008 |
| KR | 10-2011-0015438 A | 2/2011 |
| RU | 2012116086 A | 10/2013 |
| WO | 2014/111547 A1 | 7/2014 |
| WO | 2015/104450 A1 | 7/2015 |

OTHER PUBLICATIONS

Carriage of Still Image and Image Sequences, ISO/IEC DIS 23008-12, 109. MPEG Meeting; Motion Picture Expert Group or ISO/IEC JTC1/SC29/WG11, No. N14642, Jul. 2014-Nov. 2014, Sapporo.
"Text of ISO/IEC DIS 23008-12 Carriage of Still Image and Image Sequences", 109th. MPEG Meeting;Jul. 7, 2014-Jul. 11, 2014; Sapporo, Motion Picture Expert Group or ISO/IEC JTC 1/SC29/WG11, No. NI4642, Aug. 4, 2014, XP030021380, p. I, paragraph 3.1.1—p. 2, paragraph 4 p. 3, paragraph 6.2—p. 4, paragraph 6.3 p. 5, paragraph 6.7—p. 5, paragraph 6.8.1.1, Initialization data; p. 6, paragraph 6.8.2—p. 7 p. 8, paragraph 6.8.4.1 HEVC Tiles; p. 10, paragraph 6.8.5 p. 11, paragraph 7.2.2.2 p. 14, paragraph 8.1 p. 17, pp. i-Vii and 1-24 provided.
Vadakital, et al., "HEVC Still image file format (MPEG-H Part 12?)", Text of ISO/IEC CD 23008-12 Image File Format, 107th. MPEG Meeting;Jan. 13, 2014-Jan. 17, 2014; San Jose; (Motion Picture Expert Group or ISO/IEC JTC1/SC29/WG11),No. NI4148, Jan. 18, 2014, XP030020886, p. 2, paragraph 5.1—p. 3, paragraph 5.3, Initialization data; p. 4, paragraph 5.5—p. 6, Metadata support; p. 9, paragraph 7-paragraph 7.3.2.
Singer, "Disposition of comments report on ISO/IEC CD 23008-12", DoC on ISO/IEC CD 23008-12 Carriage of Still Image and Image Sequences, 109th. MPEG Meeting;Jul. 7, 2014-Jul. 11, 2014; Sapporo; (Motion Picture Expert Group or ISO/IEC JTC1/SC29/WG11), No. NI4641, Jul. 11, 2014, XP030021379, subclause 5.5.3; p. 3 subclause 6.6.1; p. 3-p. 4 subclause 5.4; p. 5 subclause 7.9 tiling grid; p. 7 subclause 5.8 metadata hvcl item; init reference; p. 8-p. 9 subclause 7.3.3 metabox handler; pp. 1-15 provided.
Concolato, et al., "Examples of use of the image file format", Image File Format—Example and White paper update, 113rd. MPEG Meeting; Oct. 19, 2015-Oct. 23, 2015; Geneva; (Motion Picture Expert Group or ISO/IEC JTC1/SC29/WG11), No. m37250, Oct. 14, 2015, XP030065618.
Concolato, et al., "Simpler signaling in the IFF",112nd. MPEG Meeting; Jun. 22, 2015-Jun. 26, 2015; Warsaw; (Motion Picture Expert Group or ISO/IEC JTC1/SC29/WG11), No. m36559, Jun. 17, 2015, XP030064927.
Hannuksela, et al., "The High Efficiency Image File Format Standard", IEEE Signal Processing Magazine, Jun. 12, 2015, vol. 32, No. 4, pp. 150-156, Figs. 1-2, pp. 150-154.
Hannuksela, et al., "Overview of the High Efficiency Image File Format", Joint Collaborative Team on Video Coding (JCT-VC) of ITU-T SG 16 WP 3 and ISO/IEC JTC 1/SC 29/WG 11, 21st Meeting: Warsaw, PL., JCTVC-U0039, Jun. 9, 2015, pp. 1-10, Sections 1-5. A copy may be obtained from the URL at http://phenix.intevry.fr/jct/doc_end_user/current_meeting.php?id_meeting=164&search_id_group=1&search_sub_group=1.

* cited by examiner

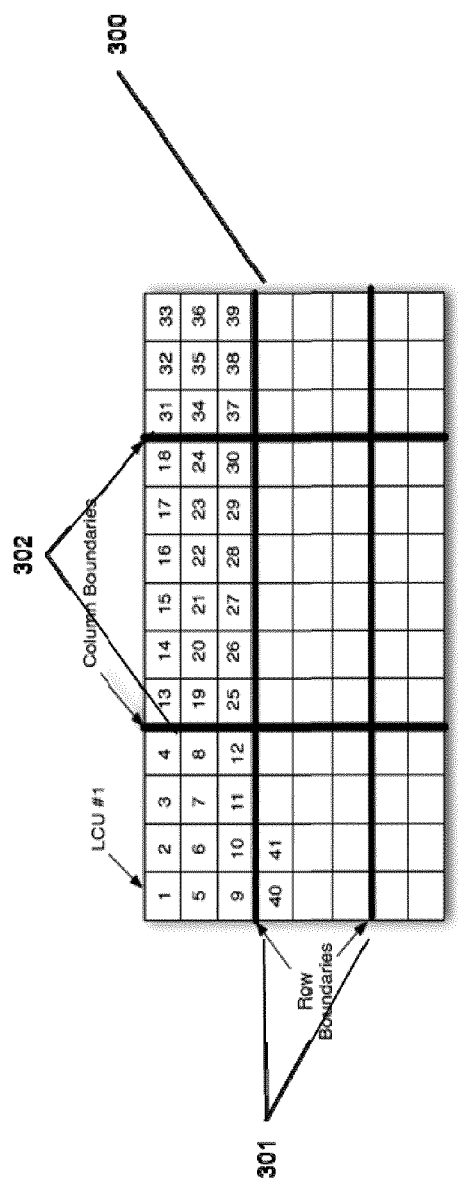
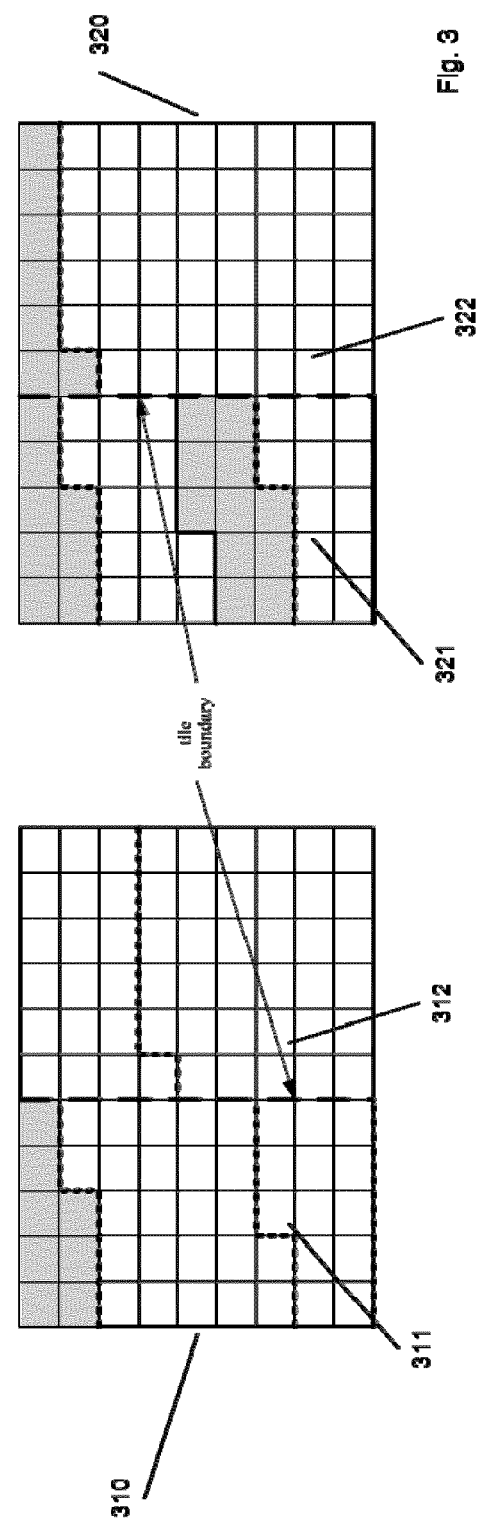
Fig. 3

```
aligned(8) class ItemInfoBox
extends FullBox('iinf', version, 0) {
    if (version == 0) {
        unsigned int(16) entry_count;
    } else {
        unsigned int(32) entry_count;
    }
    ItemInfoEntry[ entry_count ] item_infos;
}
```

```
aligned(8) class ItemInfoEntry extends FullBox('infe', version, 0) {
    if ((version == 0) || (version == 1)) {
        unsigned int(16) item_ID;
        unsigned int(16) item_protection_index
        string item_name;
        string content_type;
        string content_encoding;        //optional
    }
    if (version == 1) {
        unsigned int(32) extension_type; //optional
        ItemInfoExtension(extension_type); //optional
    }
    if (version >= 2) {
        if (version == 2) {
            unsigned int(16) item_ID;
        } else if (version == 3) {
            unsigned int(32) item_ID;
        }
        unsigned int(16) item_protection_index;
        unsigned int(32) item_type;
        string item_name;
        if (item_type=='mime') {
            string content_type;
            string content_encoding; //optional
        } else if (item_type == 'uri') {
            string item_uri_type;
        }
    }
}
```

Fig. 5

```
aligned(8) class ItemInfoEntry extends FullBox('infe', version, 0) {
  if ((version == 0) || (version == 1)) {
    unsigned int(16) item_ID;
    unsigned int(16) item_protection_index
    string item_name;
    string content_type;
    string content_encoding;      //optional
  }
  if (version == 1) {
    unsigned int(32) extension_type; //optional
    ItemInfoExtension(extension_type); //optional
  }
  if (version >= 2) {
    if (version == 2) {
      unsigned int(16) item_ID;
    } else if (version >= 3) {
      unsigned int(32) item_ID;
    }
    unsigned int(16) item_protection_index;
    unsigned int(32) item_type;
    string item_name;
    if (item_type=='mime') {
      string content_type;
      string content_encoding; //optional
    } else if (item_type == 'uri') {
      string item_uri_type;
    }
  }
  // ..... New version for additional parameters
  if (version == 4) {
    unsigned int(32) item_iref_parameter_count;
    for (i=0 ; i< item_iref_parameter_count ; i++) {
      unsigned int(32) iref_type;
      unsigned int(32) iref_parameter;
    }
  }
}
```

IMAGE DATA ENCAPSULATION

FIELD OF THE INVENTION

The present invention relates to the storage of image data, such as still images, bursts of still images or video data in a media container with descriptive metadata. Such metadata generally provides easy access to the image data and portions of the image data.

BACKGROUND OF THE INVENTION

Some of the approaches described in this section could be pursued, but are not necessarily approaches that have been previously conceived or pursued. Therefore, the approaches described in this section are not necessarily prior art to the claims in this application and are not admitted to be prior art by inclusion in this section.

The HEVC standard defines a profile for the encoding of still images and describes specific tools for compressing single still images or bursts of still images. An extension of the ISO Base Media File Format (ISOBMFF) used for such kind of image data has been proposed for inclusion into the ISO/IEC 23008 standard, in Part 12, under the name: "Image File Format". The standard covers two forms of storage corresponding to different use cases:

the storage of image sequences, with timing that is optionally used at the decoder, and in which the images may be dependent on other images, and the storage of single images, and collections of independently coded images.

In the first case, the encapsulation is close to the encapsulation of the video tracks in the ISO Base Media File Format (see document «Information technology—Coding of audio-visual objects—Part 12: ISO base media file format», ISO/IEC 14496-12:2014, Fifth edition, Avril 2015), and the same tools and concepts are used, such as the 'trak' boxes and the sample grouping for description. The 'trak' box is a file format box that contains sub boxes for describing a track, that is to say, a timed sequence of related samples.

In the second case, a set of ISOBMFF boxes, the 'meta' boxes are used. These boxes and their hierarchy offer less description tools than the 'track' boxes and relate to "information items" or "items" instead of related samples.

The image file format can be used for locally displaying multimedia files or for streaming multimedia presentations. HEVC Still Images have many applications which raise many issues.

Image bursts are one application. Image bursts are sequences of still pictures captured by a camera and stored as a single representation (many picture items referencing a block of data). Users may want to perform several types of actions on these pictures: select one as thumbnail or cover, apply effects on these pictures or the like.

There is thus a need for descriptive metadata for identifying the list of pictures with their corresponding bytes in the block of data.

Computational photography is another application. In computational photography, users have access to different resolutions of the same picture (different exposures, different focuses etc.). These different resolutions have to be stored as metadata so that one can be selected and the corresponding piece of data can be located and extracted for processing (rendering, editing, transmitting or the like).

With the increase of picture resolution in terms of size, there is thus a need for providing enough description so that only some spatial parts of these large pictures can be easily identified and extracted.

Another kind of applications is the access to specific pictures from a video sequence, for instance for video summarization, proof images in video surveillance data or the like.

For such kind of applications, there is a need for image metadata enabling to easily access the key images, in addition to the compressed video data and the video tracks metadata.

In addition, professional cameras have reached high spatial resolutions. Videos or images with 4K2K resolution are now common. Even 8 k4 k videos or images are now being common. In parallel, video are more and more played on mobile and connected devices with video streaming capabilities. Thus, splitting the videos into tiles becomes important if the user of a mobile device wants to display or wants to focus on sub-parts of the video by keeping or even improving the quality. By using tiles, the user can therefore interactively request spatial sub-parts of the video.

There is thus a need for describing these spatial sub-parts of the video in a compact fashion in the file format in order to be accessible without additional processing other than simply parsing metadata boxes. For images corresponding to the so-described videos, it is also of interest for the user to access to spatial sub-parts.

In addition, users usually transform or compose images to create new derived images. Those derived images are obtained by applying one or more specified operations, such as rotation or clipping, to other images or set of images.

There is thus a need for describing operations to be applied to one or more input images as metadata in the file format in order to retrieve derived images from original images.

The ISO/IEC 23008-12 standard covers two ways for encapsulating still images into the file format that have been recently discussed.

One way is based on 'track' boxes, and the notion of timed sequence of related samples with associated description tools, and another is based on 'meta' boxes, based on information items, instead of samples, providing less description tools, especially for region of interest description and tiling support.

There is thus a need for providing tiling support in the new Image File Format.

The use of tiles is commonly known in the prior art, especially at compression time. Concerning their indexation in the ISO Base Media File format, tiling descriptors exist in drafts for amendment of Part 15 of the ISO/IEC 14496 standard "Carriage of NAL unit structured video in the ISO Base Media File Format".

However, these descriptors rely on 'track' boxes and sample grouping tools and cannot be used in the Still Image File Format when using the 'meta' based approach. Without such descriptors, it becomes complicated to select and extract tiles from a coded picture stored in this file format.

FIG. 1 illustrates the description of a still image encoded with tiles in the 'meta' box (100) of ISO Base Media File Format, as disclosed in MPEG contribution m32254.

An information item is defined for the full picture 101 in addition to respective information items for each tile picture (102, 103, 104 and 105). Those information items are stored in a box called 'ItemInfoBox' (iinf). The box (106), called 'ItemReferenceBox', from the ISO BMFF standard is used for indicating that a 'tile' relationship (107) exists between the information item of the full picture and the four information items corresponding to the tile pictures (108). Identifiers of each information item are used so that a box (109), called 'ItemLocationBox', provides the byte range(s) in the encoded data (110) that represent each information item. Another box "ItemReferenceBox'" (112) is used for associating EXIF metadata (111) with the information item for the full picture (101) and a corresponding data block (111) is created in the media data box (110). Also, an additional information item (113) is created for identifying the EXIF metadata.

Even if the full picture and its tiles are introduced as information items, no tiling information is provided here. Moreover, when associating additional metadata with an information item (like EXIF), no data block referenced using an additional ItemReferenceBox' is created.

Reusing information on tiling from EXIF and reusing the mechanism defined in the Still Image File format draft wouldn't make it possible to describe non-regular grid with existing EXIF tags.

Thus, there is still a need for improvements in the file format for still images, notably HEVC still images. In particular, there is a need for methods for extracting a region of interest in still Images stored with this file format.

The invention lies within the above context.

SUMMARY OF THE INVENTION

According to a first aspect of the invention there is provided a method of encapsulating an encoded bitstream representing one or more images, the method comprising:
  providing tile description information comprising spatial parameters for dividing an image area into one or more tiles;
  providing tile picture item information identifying a portion of the bit stream representing a tile of a single image;
  providing reference information linking said tile picture item to said tile description information, and
  outputting said bistream together with said provided information as an encapsulated data file.

The output may be performed according to a defined standard, and is readable and decodable.

A method according to the first aspect makes it possible to easily identify, select and extract tiles from, for example, ultra-high resolution images (4K2K, 8K4K . . . ), by parsing syntax elements and without complex computation.

The description tools of the metadata boxes of the ISO Base Media File Format can be extended. In particular, it makes it possible to associate tile description with information items.

Parts of the 'meta' boxes hierarchy can be extended so as to provide additional description tools and especially to support tile-based access within still images.

A method according to the first aspect makes it possible to easily extract, from an encoded HEVC Still Picture, a region of interest based on HEVC tiles.

Embodiments of the invention provide tile description support and tile access for still images encoded according to the HEVC standard.

This makes it possible to preserve the region of interest feature available for video tracks for still image. In general, parts of a still picture corresponding to a user-defined region of interest can be identified and easily extracted for rendering or transmission to media players.

For example, said encapsulated encoded bitstream also contains information identifying a timed portion of said data stream corresponding to a video sequence.

Therefore, double indexing can be provided on a single piece of data that provides the same access facilities to the video as in some still images that are part of this video.

For example, tile description information includes a set of spatial parameters for each tile picture item.

For example, tile description information includes spatial parameters common to more than one tile picture item.

For example, tile description information is embedded in the bitstream.

For example, tile description information is provided as metadata.

For example, the reference information includes a reference type, and additional descriptive metadata including said tile description information.

For example, the reference information includes a reference type, and a reference parameter relating to said tile description information The method may further comprise providing a metadata item for referencing said tile description information in the bitstream.

For example, tile picture items are grouped and wherein the reference information is provided for linking a group of tile picture items to said tile description information.

For example, all references linking metadata items to another item are included in a single reference box in the encapsulated data file.

For example, all the relationships from one item, of any type, are stored in a single item information descriptor.

For example, wherein said outputting is performed by a server module for adaptive streaming.

For example, said outputting is performed for storage into a memory.

For example, said outputting is performed to a display module for display.

For example, said outputting is performed by a communication module for transmission.

For example, said encapsulated data file corresponds to a standardized file format.

For example, said encapsulated data file is decodable and playable.

According to a second aspect of the invention there is provided a method of processing an encapsulated data file including an encoded bitstream corresponding to one or more images, and information including tile description information comprising spatial parameters for dividing an image area into one or more tiles, the method comprising:
  selecting an image region of interest,
  identifying, from said tile description information, tiles which correspond to the selected area of interest,
  selecting one or more tile picture items linked to said identified tiles, each tile picture item identifying a portion of the bitstream representing a tile of a single image,
  extracting a portion of the bitstream identified by the selected tile picture item(s), and
  outputting said extracted bitstream portion.

For example, wherein said outputting is performed by a server module for adaptive streaming.

For example, said outputting is performed for storage into a memory.

For example, said outputting is performed to a display module for display.

For example, said outputting is performed by a communication module for transmission.

For example, said encapsulated data file corresponds to a standardized file format.

For example, said encapsulated data file is decodable and playable.

According to a third aspect of the invention there is provided a method of processing image data representing at least one image for encapsulation into an encapsulation file, the method comprising:
  obtaining a spatial subdivision of said at least one image into a plurality of image portions,
  determining at least one portion identification data identifying a data portion within said image data, representing an image portion of said plurality,
  encapsulating said image data into said encapsulation file along with at least:
  subdivision description data representing said subdivision of said at least one image,
  said portion identification data, and
  reference data linking said subdivision description data and said portion identification data.

For example, said image data represent a plurality of images of a video sequence, and the method further comprises determining at least one time identification data identifying a data portion within said image data, representing a time portion of said video sequence, and said image data are encapsulated along with said time identification data.

For example, a plurality of portion identification data are determined respectively representing a same image portion of the images of said time portion of said video sequence.

For example, at least said subdivision description data is encapsulated as metadata to the image data.

For example, said spatial subdivision is embedded in a bitstream containing said image data.

For example, respective portion identification data are determined for each image portion.

For example, common portion identification data are determined for a plurality of image portions.

The method may further comprise outputting said encapsulation file into a bitstream for adaptive streaming by a server device.

The method may further comprise outputting said encapsulation file into a bitstream for transmission to a display device for displaying said image data.

The method may further comprise outputting said encapsulation file into a bitstream for transmission to a client device.

The method may further comprise storing said encapsulation file into a storage device.

For example, the reference data includes a reference type, and additional descriptive metadata including said subdivision description data.

For example, the reference data includes a reference type and a reference parameter relating to said subdivision description data.

For example, said subdivision description data is referenced in a metadata item.

For example, portion identification data are grouped and wherein the reference data links a group of portion identification data to said portion identification data.

For example, said encapsulated file comprises a single reference box containing all reference data for the image data.

For example, said encapsulated file comprises a description containing a representation of the relationships between said subdivision description data, portion identification data and reference data.

According to a fourth aspect of the invention, there is provided a method of processing an encapsulation file comprising:
  image data representing at least one image,
  subdivision description data representing a spatial subdivision of said at least one image into a plurality of image portions,
  at least one portion identification data identifying a data portion within said image data, representing an image portion of said plurality, and
  reference data linking said subdivision description data and said portion information,
  the method comprising:
  determining a region of interest in said at least one image,
  determining, based on said subdivision description data, at least one image portion, belonging to said region of interest,
  accessing, based on said reference data, at least one portion identification data identifying a data portion within said image data, representing said at least one image portion belonging to said region of interest, and
  extracting said data portion within said image data.

For example, said image data comprise a plurality of images of a video sequence, and said encapsulation file further comprises at least one time identification data identifying a data portion within said image data, representing a time portion of said video sequence, the region of interest being determined for the images of said time portion of said video sequence and the data portions corresponding to said region of interest in a plurality of images of said time portion of said video sequence are extracted.

For example, a plurality of portion identification data respectively represent a same image portion of the images of said time portion of said video sequence.

For example, at least said subdivision description data is encapsulated as metadata to the image data.

For example, respective portion identification data are determined for each image portion.

For example, common portion identification data are determined for a plurality of image portions.

The method may further comprise receiving said encapsulation file as a bitstream adaptively streamed by a server device.

The method may further comprise displaying said region of interest.

For example, the reference data includes a reference type, and additional descriptive metadata including said subdivision description data.

For example, the reference data includes a reference type and a reference parameter relating to said subdivision description data.

For example, said subdivision description data is referenced in a metadata item.

For example, portion identification data are grouped and wherein the reference data links a group of portion identification data to said portion identification data.

For example, said encapsulated file comprises a single reference box containing all reference data for the image data.

For example, said encapsulated file comprises a description containing a representation of the relationships between said subdivision description data, portion identification data and reference data.

According to a fifth aspect of the invention, there is provided a device configured to implement a method according to the first aspect.

The device may comprise:

a processing unit configured to provide tile description information comprising spatial parameters for dividing an image area into one or more tiles; provide tile picture item information identifying a portion of the bit stream representing a tile of a single image; provide reference information linking said tile picture item to said tile description information, and a communication unit configured to output said bistream together with said provided information as an encapsulated data file.

According to a sixth aspect of the invention, there is provided a device configured to implement a method according to the second aspect.

The device may be configured to process an encapsulated data file including an encoded bitstream corresponding to one or more images, and information including tile description information comprising spatial parameters for dividing an image area into one or more tiles. The device may also comprise:

a processing unit configured to select an image region of interest, identify, from said tile description information, tiles which correspond to the selected area of interest, select one or more tile picture items linked to said identified tiles, each tile picture item identifying a portion of the bitstream representing a tile of a single image, extract a portion of the bitstream identified by the selected tile picture item(s), and a communication unit configured to output said extracted bitstream portion According to a seventh aspect of the invention, there is provided a device configured to implement a method according to the third aspect.

The device may be configured to process image data representing at least one image for encapsulation into an encapsulation file, and the device may comprise a processing unit configured to obtain a spatial subdivision of said at least one image into a plurality of image portions, determine at least one portion identification data identifying a data portion within said image data, representing an image portion of said plurality, encapsulate said image data into said encapsulation file along with at least:

subdivision description data representing said subdivision of said at least one image, said portion identification data, and reference data linking said subdivision description data and said portion identification data.

According to an eighth aspect of the invention, there is provided a device configured to implement a method according to the fourth aspect.

The device may be configured to process an encapsulation file comprising:

image data representing at least one image, subdivision description data representing a spatial subdivision of said at least one image into a plurality of image portions, at least one portion identification data identifying a data portion within said image data, representing an image portion of said plurality, and reference data linking said subdivision description data and said portion information.

The device may also comprise a processing unit configured to determine a region of interest in said at least one image, determine, based on said subdivision description data, at least one image portion, belonging to said region of interest, access, based on said reference data, at least one portion identification data identifying a data portion within said image data, representing said at least one image portion belonging to said region of interest, and extract said data portion within said image data.

According to a ninth aspect of the invention, there is provided a system comprising:

a first device according to the fifth of seventh aspect, and a second device according to the sixth of eighth aspect for processing files from said first device.

According to a tenth aspect of the invention there are provided computer programs and computer program products comprising instructions for implementing methods according to the first, second, third and/or fourth aspect(s) of the invention, when loaded and executed on computer means of a programmable apparatus.

According to a eleventh aspect of the invention there is provided a method of encapsulating an encoded bitstream representing one or more images, the encapsulated bitstream comprising a data part and a metadata part. The method comprises:

providing image item information identifying a portion of the data part representing a sub-image or an image of a single image;

providing image description information comprising parameters including display parameters and/or transformation operators relating to one or more images and outputting said bitstream together with said provided information as an encapsulated data file;

wherein the image description information is stored in the metadada part.

In an embodiment each parameter comprised in the image description information is associated with additional data which comprises:

type information, and/or an identifier used to link an image item information to said parameter.

In an embodiment metadata part is included in an ISOB-MFF's 'meta' data box.

In an embodiment additional data is a header.

In an embodiment additional data is a Virtual item.

In another embodiment, each transformation operators comprised in the image description information is associated with additional data which comprises an identifier used to link a transformed item to said transformation operators.

In an embodiment a box stored in the metadata part include at least one transformation operator.

In an embodiment the data part of the encapsulated bitstream comprises the transformed item associated to one or more transformation operators, the metadata part further comprising:

information for identifying the original image the transformation operator is applied on, and information for localizing the transformed item in the data part.

In an embodiment, the transformed item includes at least one transformation index, an index allowing to identify one of the transformation operator in the metadata part.

According to a twelfth aspect of the invention there is provided a method of processing an encapsulated data file comprising a data part and a metadata part, including an encoded bitstream corresponding to one or more images in the data part, and information in the metadata part including image or sub-image description information comprising parameters including display parameters and/or transformation operators relating to one or more image or sub-images. The method comprises:

selecting an image or a sub-image of interest,
identifying, from said referenced image or sub-image description information, associated display parameters and/or transformation operators from the meta data part;
in the case that transformation operators have been identified, applying the transformation to the image or sub-image, and displaying said image or sub image eventually transformed, according to said display parameters.

In an embodiment the method further comprises prior to the identifying step, retrieving additional data comprised in said parameters, said additional data comprising:
type information, and/or
an identifier used to link an image or sub-image item information to said parameter.

In an embodiment metadata part is included in an ISOB-MFF's 'meta' data box.

In an embodiment additional data is a header.

In an embodiment additional data is a Virtual item.

In another embodiment, each transformation operators comprised in the image description information is associated with additional data which comprises an identifier used to link a transformed item to said transformation operators.

In an embodiment a box stored in the metadata part include at least one transformation operator.

In an embodiment the data part of the encapsulated bitstream comprises the transformed item associated to one or more transformation operators, the metadata part further comprising:
information for identifying the original image the transformation operator is applied on, and
information for localizing the transformed item in the data part.

In an embodiment, the transformed item includes at least one transformation index, an index allowing to identify one of the transformation operator in the metadata part.

According to a thirteenth aspect of the invention there is provided server device of encapsulating an encoded bitstream representing one or more images, configured to implement an encapsulating method according to the eleventh aspect of the invention.

According to a fourteenth aspect of the invention there is provided client device of encapsulating an encoded bitstream representing one or more images, configured to implement a processing method according to the twelfth aspect of the invention.

According to a fifteenth aspect of the invention there are provided computer programs and computer program products comprising instructions for implementing methods according the eleventh and twelfth aspect of the invention, when loaded and executed on computer means of a programmable apparatus.

According to a sixteenth aspect of the invention there is provided a method of encapsulating an encoded bitstream representing one or more images, the encapsulated bitstream comprising a data part and a metadata part, the method comprising:
providing image item information identifying a portion of the data part representing a sub-image or an image of a single image and/or a set of single images;
providing image description information comprising parameters including display parameters and/or transformation operators relating to one or more images and
outputting said bitstream together with said provided information as an encapsulated data file.

Said image item information comprises one or more properties including at least part of the image description information dedicated to the considered sub-image or single image or set of single images, said image description information being defined in one or more boxes.

This aspect of the invention allows to provide a clear separation of data and metadata for an efficient referencing mechanism.

In an embodiment the image item information is a box and each image item information's property is a box, the property boxes being organized in order to form a table of boxes.

In an embodiment each property is applied to the sub-image or image and/or the set of single images by following the order of appearance or the corresponding box in the table of boxes.

In an embodiment the sub-image or the single image and/or the set of single images are related to a video sequence, one of the image item information properties comprising one or more initialization parameters to refer to initialization information of said video sequence.

In an embodiment part of the image description information shared among several sub-images or single images and/or set of single images, is defined in one dedicated shared box, each image description information being retrievable via a structure for linking the considered image item information, to at least one image description information, said linking structure comprising:
a first identifier per considered image item information, said first identifier being defined as an image item information's property and referencing a second identifier having the same value in the dedicated shared box,
one or several second identifiers included in the dedicated shared box, each second identifier referencing an image description information.

In an embodiment part of image description information shared among several sub-images or single images and/or a set of single images is defined in two dedicated shared boxes, one shared box being related to the display parameters and one other shared box being related to the transformation operators, each image description information being retrievable via a structure for linking the image item information to at least one image description information.

In an embodiment said linking structure comprises two reference type parameters linking the image item information and at least one image description information, each reference type parameter being specific to one of the dedicated shared boxes.

In an embodiment said linking structure comprising:
a first and second identifiers per considered image item information, said first identifier being defined as an image item information's property and referencing a third identifiers in the dedicated shared box related to the display parameters, said second identifiers being defined as an image item information's property and referencing a fourth identifiers in the dedicated shared box related to the transformation operators,
one or several third and fourth identifiers respectively included in the dedicated shared boxes related to the display parameters and the transformation operators, each third and fourth identifiers respectively referencing a display parameter and a transformation operator.

In an embodiment one of the display parameters is a grid for defining a set of single images corresponding to parts of a single image.

In an embodiment the images from the set of single images are related to a same single image.

According to a seventeenth aspect of the invention there is provided a method of obtaining an encapsulated bitstream representing one or more images, the encapsulated bitstream comprising an encoded data part and a metadata part, the method comprising:

obtaining image item information identifying a portion of the data part representing a sub-image or an image of a single image and/or a set of single images;

obtaining image description information comprising parameters including display parameters and/or transformation operators relating to one or more images and extracting said bitstream together with said determined information as an encapsulated data file.

Said image item information comprises one or more properties including at least part the image description information dedicated to the considered sub-image or single image or set of single images, said image description information being defined in one or more boxes.

In an embodiment the image item information is a box and each image item information's property is a box, the property boxes being organized in order to form a table of boxes.

In an embodiment each property is applied to the sub-image or image and/or the set of single images by following the order of appearance or the corresponding box in the table of boxes.

In an embodiment the sub-image or the single image and/or the set of single images are related to a video sequence, one of the image item information properties comprising one or more initialization parameters to refer to initialization information of said video sequence.

In an embodiment part of the image description information shared among several sub-images or single images and/or set of single images, is defined in one dedicated shared box, each image description information being retrievable via a structure for linking the considered image item information, to at least one image description information, said linking structure comprising:

a first identifier per considered image item information, said first identifier being defined as an image item information's property and referencing a second identifier having the same value in the dedicated shared box, one or several second identifiers included in the dedicated shared box, each second identifier referencing an image description information.

In an embodiment part of image description information shared among several sub-images or single images and/or a set of single images is defined in two dedicated shared boxes, one shared box being related to the display parameters and one other shared box being related to the transformation operators, each image description information being retrievable via a structure for linking the image item information to at least one image description information.

In an embodiment said linking structure comprises two reference type parameters linking the image item information and at least one image description information, each reference type parameter being specific to one of the dedicated shared boxes.

In an embodiment said linking structure comprising:

a first and second identifiers per considered image item information, said first identifier being defined as an image item information's property and referencing a third identifiers in the dedicated shared box related to the display parameters, said second identifiers being defined as an image item information's property and referencing a fourth identifiers in the dedicated shared box related to the transformation operators, one or several third and fourth identifiers respectively included in the dedicated shared boxes related to the display parameters and the transformation operators, each third and fourth identifiers respectively referencing a display parameter and a transformation operator.

In an embodiment one of the display parameters is a grid for defining a set of single images corresponding to parts of a single image.

In an embodiment the images from the set of single images are related to a same single image.

According to an eighteenth aspect of the invention there is provided a device for encapsulating an encoded bitstream representing one or more images, configured for implementing a method according to the sixteenth aspect of the invention.

According to an nineteenth aspect of the invention there is provided a device for processing an encapsulated bitstream representing one or more images, configured for implementing a method according to according to the seventeenth aspect of the invention.

According to an twentieth aspect of the invention there is provided a system comprising:

a first device according to the eighteenth aspect of the invention, and a second device according to the nineteenth aspect of the invention for processing files from said first device.

According to a twenty-first aspect of the invention there is provided a computer program product comprising instructions for implementing a method according to the sixteenth or the seventeenth aspect of the invention when the program is loaded and executed by a programmable apparatus.

According to a twenty-second aspect of the invention there is provided a non-transitory information storage means readable by a computer or a microprocessor storing instructions of a computer program, for implementing a method according to the sixteenth or the seventeenth aspect of the invention, when the program is loaded and executed by the computer or microprocessor.

According to a twenty-third aspect of the invention there is provided a method of encapsulating an encoded bitstream representing one or more images, the encapsulated bitstream comprising a data part and a metadata part. The method comprises:

providing image item information identifying a portion of the data part representing a sub-image or an image of a single image and/or a set of single images;

providing image description information comprising parameters including display parameters and/or transformation operators relating to one or more images and outputting said bitstream together with said provided information as an encapsulated data file.

The image description information is defined in one or two dedicated boxes, each image description information being retrievable via a structure for linking the image item information to at least one image description information.

In an embodiment the image description information is defined in one dedicated box, said linking structure comprises a reference type parameter linking the image item information and at least one image description information.

In an embodiment the image description information is defined in one or two dedicated boxes, said linking structure comprises one or two set of indexes for linking the image item information and at least one image description information, each set being associated to one of the dedicated boxes.

In an embodiment the image description information is defined in two dedicated boxes, one box being related to the display parameters and one other box being related to the transformation operators.

In an embodiment the image description information is defined in two dedicated boxes, said linking structure comprises two reference type parameters respectively associated to each one of the two dedicated boxes, each reference type parameter linking the image item information and at least one image description information in the associated dedicated box.

According to a twenty-fourth aspect of the invention there is provided a method of obtaining an encapsulated bitstream representing one or more images, the encapsulated bitstream comprising an encoded data part and a metadata part, the method comprising:
  obtaining image item information identifying a portion of the data part representing a sub-image or an image of a single image and/or a set of single images;
  obtaining image description information comprising parameters including display parameters and/or transformation operators relating to one or more images and extracting said bitstream together with said determined information as an encapsulated data file.
  wherein the image description information is defined in one or two dedicated boxes, each image description information being retrievable via a structure for linking the image item information to at least one image description information.

In an embodiment the image description information is defined in one dedicated box, said linking structure comprises a reference type parameter linking the image item information and at least one image description information.

In an embodiment the image description information is defined in one or two dedicated boxes, said linking structure comprises one or two set of indexes for linking the image item information and at least one image description information, each set being associated to one of the dedicated boxes.

In an embodiment the image description information is defined in two dedicated boxes, one box being related to the display parameters and one other box being related to the transformation operators.

In an embodiment the image description information is defined in two dedicated boxes, said linking structure comprises two reference type parameters respectively associated to each one of the two dedicated boxes, each reference type parameter linking the image item information and at least one image description information in the associated dedicated box.

According to a twenty-fifth aspect of the invention there is provided a device for encapsulating an encoded bitstream representing one or more images, configured for implementing a method according to the twenty-third aspect of the invention.

According to a twenty-sixth aspect of the invention there is provided a device for processing an encapsulated bitstream representing one or more images, configured for implementing a method according to the twenty-fourth aspect of the invention.

According to a twenty-seventh aspect of the invention there is provided a system comprising:
  a first device according to the twenty-fifth aspect of the invention, and
  a second device according to the twenty-sixth aspect of the invention for processing files from said first device.

According to a twenty-eighth aspect of the invention there is provided a computer program product comprising instructions for implementing a method according to the twenty-third or twenty-fourth aspects of the invention when the program is loaded and executed by a programmable apparatus.

According to a twenty-eighth aspect of the invention there is provided a non-transitory information storage means readable by a computer or a microprocessor storing instructions of a computer program, for implementing a method according to the twenty-third or twenty-fourth aspects of the invention, when the program is loaded and executed by the computer or microprocessor.

BRIEF DESCRIPTION OF THE DRAWINGS

Other features and advantages of the invention will become apparent from the following description of non-limiting exemplary embodiments, with reference to the appended drawings, in which, in addition to FIG. 1:

FIG. 3 illustrates various tile/slice configurations in HEVC;

FIG. 5 illustrates the standard metadata for describing information items in 'meta' boxes of the ISOBMFF;

FIG. 6 illustrates an exemplary extension to the information item description;

DETAILED DESCRIPTION OF THE INVENTION

In what follows, embodiments of the invention are described.

Figure 1:
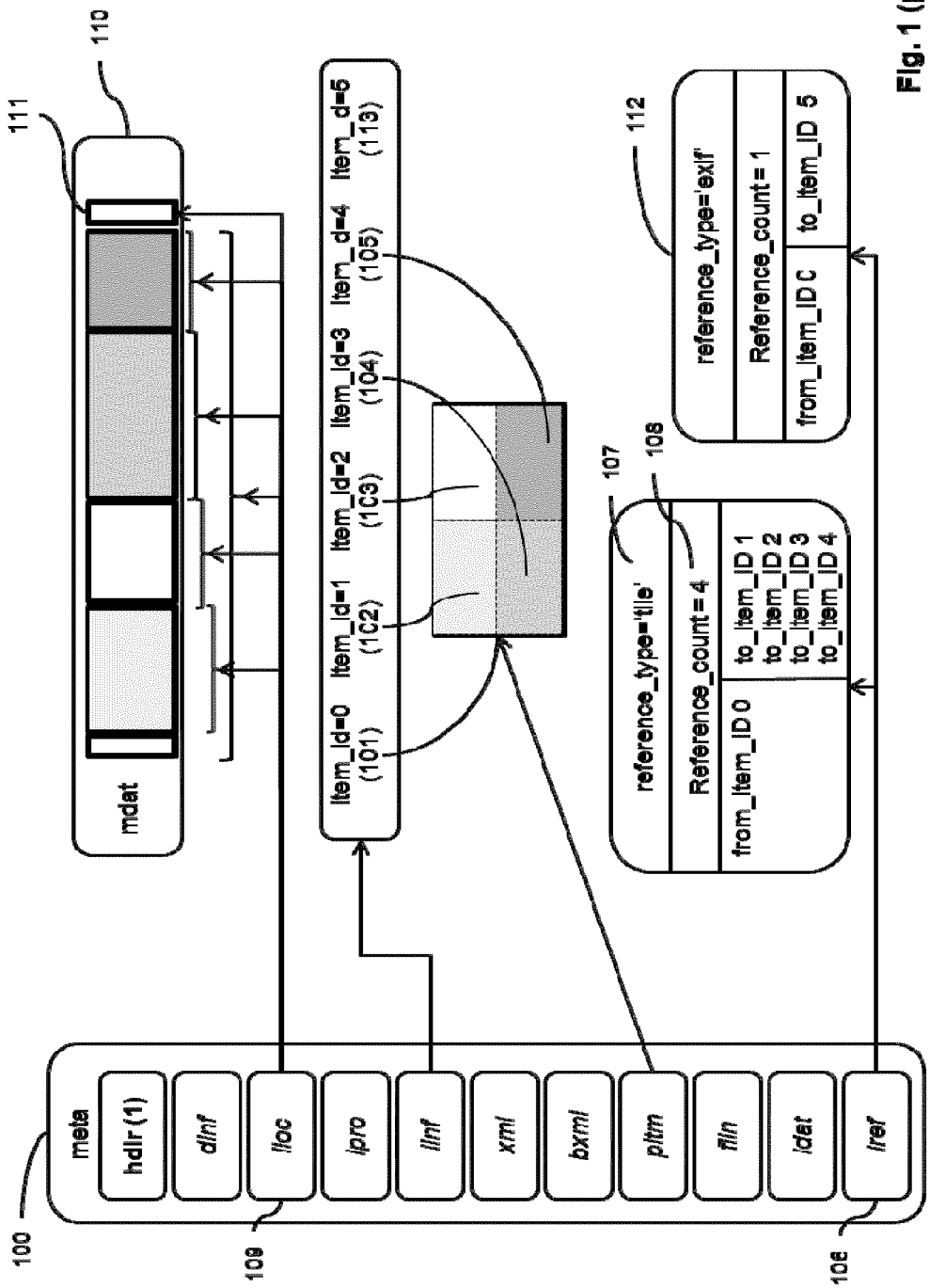
Figure 2:
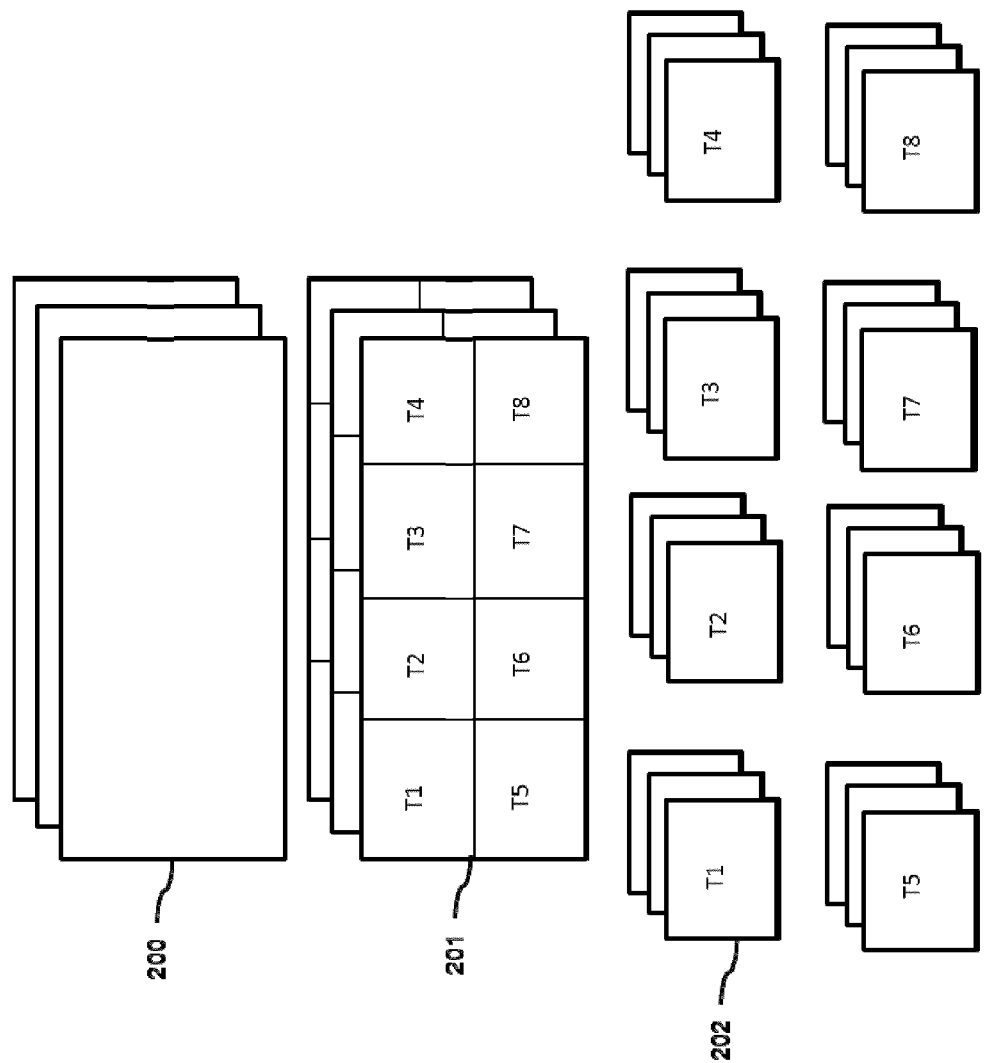
FIG. 2 illustrates an example of a tiled video.

In order to better understand the technical context, video tiling is explained with reference to FIG. 2 which shows a video (200) having consecutive temporal frames. Each frame (201) is divided into 8 portions (here rectangular portions) referred to as "tiles" T1 to T8. The number and the shape of the tiles can be different. In what follows, it is considered that the tiling is the same whatever the index of the video frame.

The result of this tiling is 8 independent sub-videos (202). These sub-videos represent a partition of the whole global video. Each independent sub-video can be encoded as an independent bitstream, according to the AVC or HEVC standards for example. The sub-video can also be part of one single video bitstream, like for example tiles of the HEVC standard or slices of the AVC standard.

The HEVC standard defines different spatial subdivision of pictures: tiles, slices and slice segments. These different subdivisions (or partitions) have been introduced for different purposes: the slices are related to streaming issues while the tiles and the slice segments have been defined for parallel processing.

A tile defines a rectangular region of a picture that contains an integer number of Coding Tree Units (CTU). FIG. 3 shows the tiling of an image (300) defined by row and column boundaries (301, 302). This makes the tiles good candidates for regions of interest description in terms of position and size. However, the HEVC standard bitstream organization in terms of syntax and its encapsulation into Network Abstract Layer (NAL) units is rather based on slices (as in AVC standard).

According to the HEVC standard, a slice is a set of slice segments, with at least the first slice segment being an independent slice segment, the others, if any, being dependent slice segments. A slice segment contains an integer number of consecutive CTUs (in the raster scan order). It has not necessarily a rectangular shape (thus less appropriate than tiles for region of interest representation). A slice segment is encoded in the HEVC bitstream as a header called "slice_segment_header" followed by data called "slice_segment_data". Independent slice segments and dependent slice segments differ by their header: dependent slice segments have a shorter header because they reuse information from the independent slice segment's header. Both independent and dependent slice segments contain a list of entry points in the bitstream: either to tiles or to entropy decoding synchronization points.

FIG. 3 shows different configurations of images 310 and 320 of slice, slice segments and tiles. These configurations differ from the configuration of image 300 in which one tile has one slice (containing only one independent slice segment). Image 310 is partitioned into two vertical tiles (311, 312) and one slice (with 5 slice segments). Image 320 is split into two tiles (321, 322), the left tile 321 having two slices (each with two slice segments), the right tile 322 having one slice (with two slice segments). The HEVC standard defines organization rules between tiles and slice segments that can be summarized as follows (one or both conditions have to be met):

All CTUs in a slice segment belong to the same tile, and
All CTUs in a tile belong to the same slice segment In order to have matching region of interest support and transport, the configuration 300, wherein one tile contains one slice with one independent segment, is preferred. However, the encapsulation solution would work with the other configurations 310 or 320.

While the tile is the appropriate support for regions of interest, the slice segment is the entity that will be actually put into NAL units for transport on the network and aggregated to form an access unit (coded picture or sample at file format level). According to the HEVC standard, the type of NAL unit is specified in a NAL unit header. For NAL units of type "coded slice segment", the slice_segment_header indicates via the "slice_segment_address" syntax element the address of the first coding tree block in the slice segment. The tiling information is provided in a PPS (Picture Parameter Set) NAL unit. The relation between a slice segment and a tile can then be deduced from these parameters.

By definition, on tiles borders, the spatial predictions are reset. However, nothing prevents a tile from using temporal predictors from a different tile in the reference frame(s). In order to build independent tiles, at encoding time, the motion vectors for the prediction units inside a tile are constrained to remain in the co-located tile in the reference frame(s). In addition, the in-loop filters (deblocking and SAO) have to be deactivated on the tiles borders so that no error drift is introduced when decoding only one tile. This control of the in-loop filters is already available in the HEVC standard and is set in slice segment headers with the flag called "loop_filter_across_tiles_enabled_flag". By explicitly setting this flag to 0, the pixels at the tiles borders do not depend on the pixels that fall on the border of the neighbor tiles. When the two conditions on motion vectors and on in-loop filters are met, the tiles are said "independently decodable" or "independent".

When a video sequence is encoded as a set of independent tiles, it may be decoded using a tile-based decoding from one frame to another without risking missing reference data or propagation of reconstruction errors. This configuration makes it possible to reconstruct only a spatial part of the original video that corresponds, for example, to a region of interest.

In what follows, independent tiles are considered.

Figure 4:
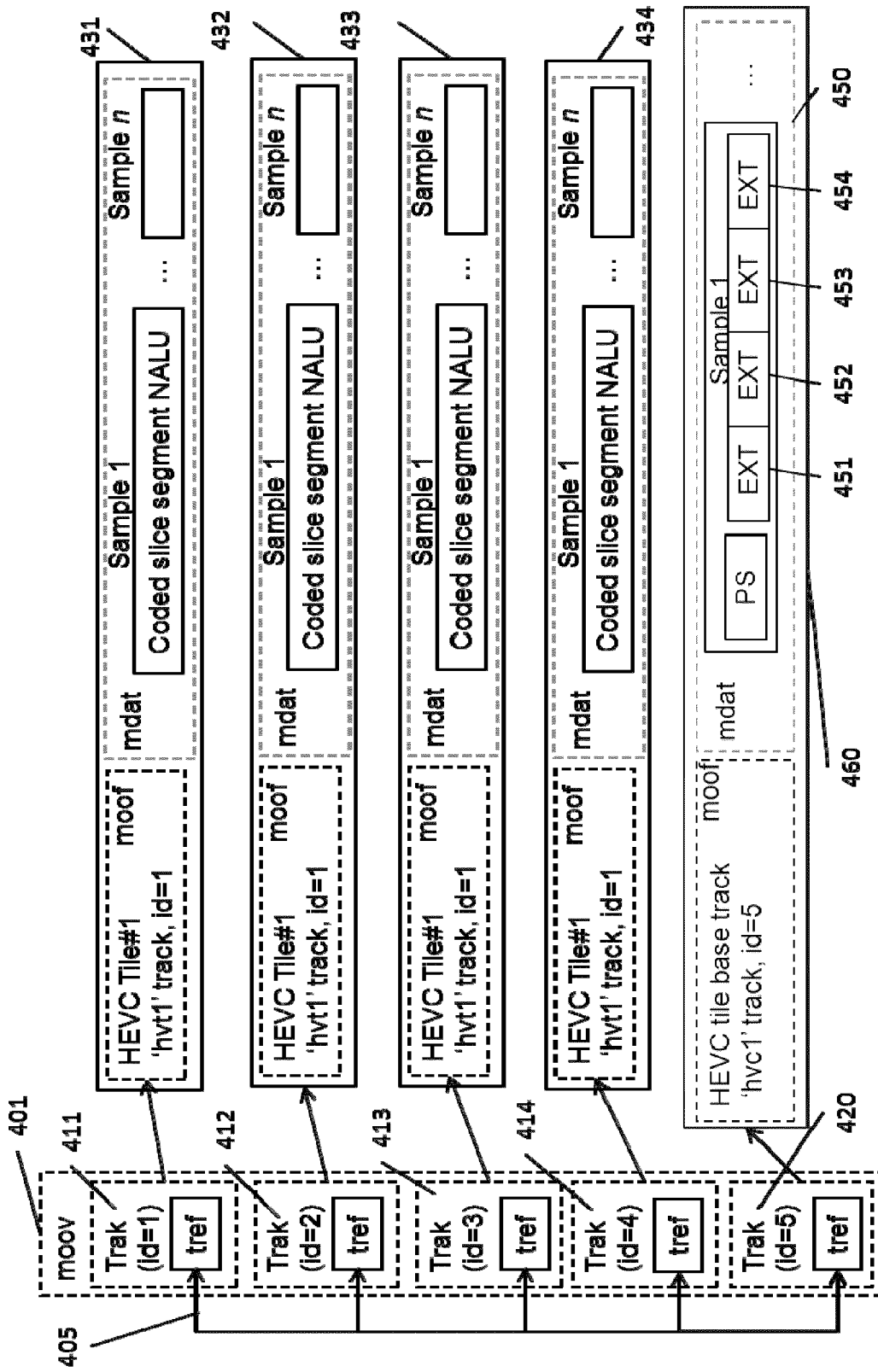
FIG. 4 illustrates the tile encapsulation according to the ISO Base Media File format with 'track' boxes.

With reference to FIG. 4, encapsulation of tiles into ISOBMFF file format is described. For example, each tile is encapsulated into a dedicated track. The setup and initialization information common to all tiles is encapsulated into a specific track, called for example the "tile base track". The full video is thus encapsulated as a composition of all these tracks, namely the tile base track and the set of tile tracks.

FIG. 4 illustrates an exemplary encapsulation. One way to encapsulate tiled video according to the ISOBMFF standard is to split each tile into a dedicated track, to encapsulate the setup and initialization information common to all tiles in a specific track, called for example the "tile base track" and to encapsulate the full video as a composition of all these tracks: tile base track plus a set of tile tracks. The encapsulation is thus referred to as "multi-track tile encapsulation". An example of multi-track tile encapsulation is provided in FIG. 4.

Box 401 represents the main ISOBMFF box 'moov' and contains the full list of tracks with their identifiers. For example, boxes 411 to 414 represent tile tracks (four tiles in the present example) and box 420 represents the tile base track. Additional tracks such as audio or text tracks may be used and encapsulated in the same file. However, for the sake of conciseness such additional tracks are not discussed here.

As represented in FIG. 4, the tile data is split into independent and addressable tracks so that any combination of tile track(s) can easily be reconstructed from the tile base track referencing the tile tracks for decoding and display. The tile base track may also be referred to as the "composite track" or "reference track" since it is designed to allow combination of any tiles: one, many or all tiles. The tile base track 420 contains common information to all the tile tracks and a list of samples 450 (only the first one is represented in FIG. 4) in a "mdat" box. Each sample 450 of the tile base track 420 is built by reference to each tile track through the use of extractors (451 to 454 each one representing one extractor to each tile). Each tile track 411 to 414 represents a spatial part of the whole, or full-frame, video. The tile description (position, size, bandwidth etc.) is stored in the track header boxes (not represented) of each tile track 411 to 414. The tile base track and each tile track are cross-referenced (405) using a box "TrackReferenceBox" in each track. Each tile track 411 to 414 refers to the tile base track 420 as the 'tbas' track ('tbas' is a specific code indicating a coding dependency from each tile track to the tile base track, in particular where to find the parameter "HEVCDecoderConfigurationRecord" that makes it possible to setup the video decoder that will process the elementary stream resulting from the file format parsing). Conversely, in order to enable full-video reconstruction, the tile base track 420 indicates a dependency of type 'scal' to each tile track (405). This is to indicate the coding dependency and to reflect the sample 450 definition of the tile base track as extractors to the tile tracks data. These extractors are specific extractors that, at parsing time, can support the absence of data. In FIG. 4, in order to provide a streamable version of the file, each track is decomposed into media segments (431 to 434 for the tile tracks and 460 for the tile base track). Each media segment comprises one or more movie fragments, indicated by the 'moof' box plus data. For tile tracks, the data part corresponds to a spatial sub-part of the video while for the tile base track, it contains the parameter sets, SEI messages when present and the list of extractors. The "moov" box 401 in case of streaming application would fit in an initialization segment. FIG. 4 illustrates only one segment but the tracks can be decomposed into any number of segments, the constraint being that segments for tile tracks and for tile base track follow the same temporal decomposition (i.e. they are temporally aligned), this is to make switching possible from full-video to a tile or a set of tiles. The granularity of this temporal decomposition is not described here, for the sake of conciseness.

The file format has descriptive metadata (such as "VisualSampleGroupEntries" for instance, or track reference types in Val' boxes) that describe the relationships between the tracks so that the data corresponding to one tile, a combination of tiles or all the tiles can easily be identified by parsing descriptive metadata.

In what follows, still images are described at the same level. Thus, upon user selection of any tiles, combination of tiles or all tiles of a picture, identification and extraction is facilitated. In case the pictures are mixed with video data, the description comes in parallel to the descriptive metadata for the video. Thus, for the same data set, an additional indexation layer is provided for the pictures (in addition to the indexation layers for the video and for the audio).

In still image file formats using 'meta' boxes, the pictures with the related information are described as information items. As illustrated in FIG. 5, the information items are listed in a dedicated sub-box "ItemInfoBox" 500 of the 'meta' box. This sub-box provides the number of information items present in the file. The sub-box also provides for each item, descriptive metadata represented as "IteminfoEntry" 501. Several versions 502 (0, 1, 2, 3) of this box exist according to the ISO BMFF standard evolution.

"Meta" items may not be stored contiguously in a file. Also, there is no particular restriction concerning the interleaving of the item data. Thus, two items in a same file may share one or several blocks of data. This is particularly useful for HEVC tiles (tiles can be stored contiguously or not), since it can make it straightforward to have one item per independently decodable tile. This item indicates the data offset in the main HEVC picture and length of the slice(s) used for the tile through an ItemLocationBox.

According to embodiments, a new item type for describing a tile picture may be added, named for example: "hvct" or 'tile' or reused from ISO/IEC 14496-15: 'hvt1'. Each item representing the tile picture (whatever the four character code chosen) may have a reference of type "tbas" to the 'hvc1' item from which it is extracted. Each item has an identifier "item_ID" 503 and is further described in a box "ItemLocationBox" in terms of byte position and size in the media data box containing the compressed data for the pictures.

Such syntax makes it possible for a file format reader (or "parser"), to determine, via the list of information items, how many information items are available with information concerning their type 504, for example 'tile' to indicate an information item is a tile picture of a full picture.

Thus, it is made possible to select a subset of information items in the file, a combination thereof, or the full set of information items in order to download only one tile of the image and the associated decoder configuration, while skipping the other tiles.

For cases where an HEVC tile depends on another HEVC tile for decoding, the dependency shall be indicated by an item reference of type 'dpnd' (or any specific four character code that indicates coding dependencies) as described in document w14123, WD of ISO/IEC 14496-15:2013 AMD 1, "Enhanced carriage of HEVC and support of MVC with depth information", MPEG 107 San José January 2014.

This document defines tools for associating HEVC tile NALUs with sample group descriptions indicating the spatial position of the tile (using the "TileRegionGroupEntry" descriptor). However, there is no direct equivalent of sample grouping for metadata information items which could allow reuse of these descriptors.

Therefore, according to embodiments, a tile description item is defined per tile and the tile is linked to its description using a modified version of the "ItemReferenceBox" box as explained below.

According to other embodiments, only one tiling description is provided, preferably in a generic way. Thus, the item list does not get too long.

The design may be as follows:
  allow some items to describe a set of metadata, similar to sample groups but specific to each item type,
  for any item, add the ability to describe one parameter for a given type of item reference. The parameter would then be interpreted depending on the type of the referred item (similar to grouping type).

An upgrade of the descriptive metadata for an information item may be needed as explained in what follows with reference to FIG. 6.

According to the ISOBMFF standard, the sample grouping mechanism is based on two main boxes having a "grouping_type" parameter as follows:
  the box "SampleGroupDescriptionBox" has a parameter 'sgpd' that defines a list of properties (a list "SampleGroupEntry"),
  the box "SampleToGroupBox" has a parameter 'sbgp' that defines a list of sample group with their mapping to a property.

The "grouping_type" parameter links a list of sample groups to a list of properties, the mapping of a sample group to one property in the list being specified in the box "SampleToGroupBox".

In order to provide the same functionality for the information items, a list of information items groups and a list of properties have to be described. Also, it should be made possible to map each group of information items to a property.

In what follows, there is described how to make possible such descriptive metadata to be embedded in the Still Image File Format. In other words, how to link a descriptor to an image item. Even if the use cases are described for the HEVC Still Image File Format, the following features may be used in other standards such as ISO/IEC 14496-12 for associating any kind of information item with additional descriptive metadata.

According to embodiments, the existing "ItemInformationEntry" box 601 with parameter 'infe' is extended with a new version number (602 and 603) in order to link each item to a property via a new parameter called "iref_type" 604 as shown in FIG. 6. This makes it possible to avoid the creation of new boxes and improves the description while keeping it short.

The original definition of ItemInformationEntry box is given by:

```
if (version >= 2) {
    if (version == 2) {
        unsigned int(16)     item_ID;
    } else if (version == 3) {
        unsigned int(32)     item_ID;
    }
    unsigned int(16)   item_protection_index;
    unsigned int(32)   item_type;
    string             item_name;
    if (item_type=='mime') {
        string             content_type;
        string             content_encoding;   //optional
    } else if (item_type == 'uri ') {
        string             item_uri_type;
    }
}
```

A new version making linking a tile picture to its description may be as follows:

```
if (version >= 2) {
    if (version == 2) {
        unsigned int(16)     item_ID;
    } else if (version >= 3) {
        unsigned int(32)     item_ID;
    }
    unsigned int(16)   item_protection_index;
    unsigned int(32)   item_type;
    string             item_name;
    if (item_type=='mime') {
        string             content_type;
        string             content_encoding;   //optional
    } else if (item_type == 'uri ') {
        string             item_uri_type;
    }
    if (version == 4) {
        unsigned int(32) item_iref_parameter_count;
        for (i=0 ; i< item_iref_parameter_count ; i++) {
            unsigned int(32) iref_type;
            unsigned int(32) iref_parameter;
        }
    }
}
```

According to other embodiments, closer to the box "SampleToGroupBox", the definition of the box "IteminformationBox" with four character code 'inf' is changed as follows, for example by introducing a new version of this box:
the current version:

```
aligned(8) class ItemInfoBox
        extends FullBox('iinf', version, 0) {
    if (version == 0) {
        unsigned int(16)   entry_count;
    } else {
        unsigned int(32) entry_count;
    }
    ItemInfoEntry[ entry_count ]     item_infos;
}
``` is changed into:

```
aligned(8) class ItemInfoBox extends FullBox('iinf', version = 2, 0) {
    unsigned int(16)group_entry_count;
    for (int g=0; g< group_entry_count;g++){
        unsigned int(16) item_run;
        unsigned int(16) grouping_type;
        unsigned int(16) property_index;
        unsigned int(32) entry_count;
        ItemInfoEntry[ entry_count ] item_infos;
    }
    unsigned int(16) remaining_entry_count;
    ItemInfoEntry[remaining_entry_count ] item_infos;
}
```

Alternatively, in order to signal whether group is in use or not, the current version is changed into:

```
aligned(8) class ItemInfoBox extends FullBox('iinf', version = 2, 0) {
    unsigned int(1)group_is_used;
    if (group_is_used == 0){ // standard iinf box but with 1 additional byte overhead
        unsigned int(7)reserved; // for byte alignment
        unsigned int(32) entry_count;
        ItemInfoEntry[ entry_count ] item_infos;
    } else {
        unsigned int(15)group_entry_count;
        for (int g=0; g< group_entry_count;g++){
            unsigned int(16) item_run;
            unsigned int(16) grouping_type;
            unsigned int(16) property_index;
            unsigned int(32) entry_count;
            ItemInfoEntry[ entry_count ] item_infos;
        }
        unsigned int(16) remaining_entry_count;
        ItemInfoEntry[remaining_entry_count ] item_infos;
    }
}
```

The "group_entry_count" parameter defines the number of information items groups in the media file. For each group of information item, a number of information items is indicated, starting from item_ID=0. Since information items have no time constraints and relationships, contrary to the samples, the encapsulation module can assign the information item identifiers in any order. By assigning increasing identifiers numbers following the items group, the list of information group can be more efficiently represented using a parameter item_run identifying the runs of consecutive information items identifiers in a group.

Figure 7:
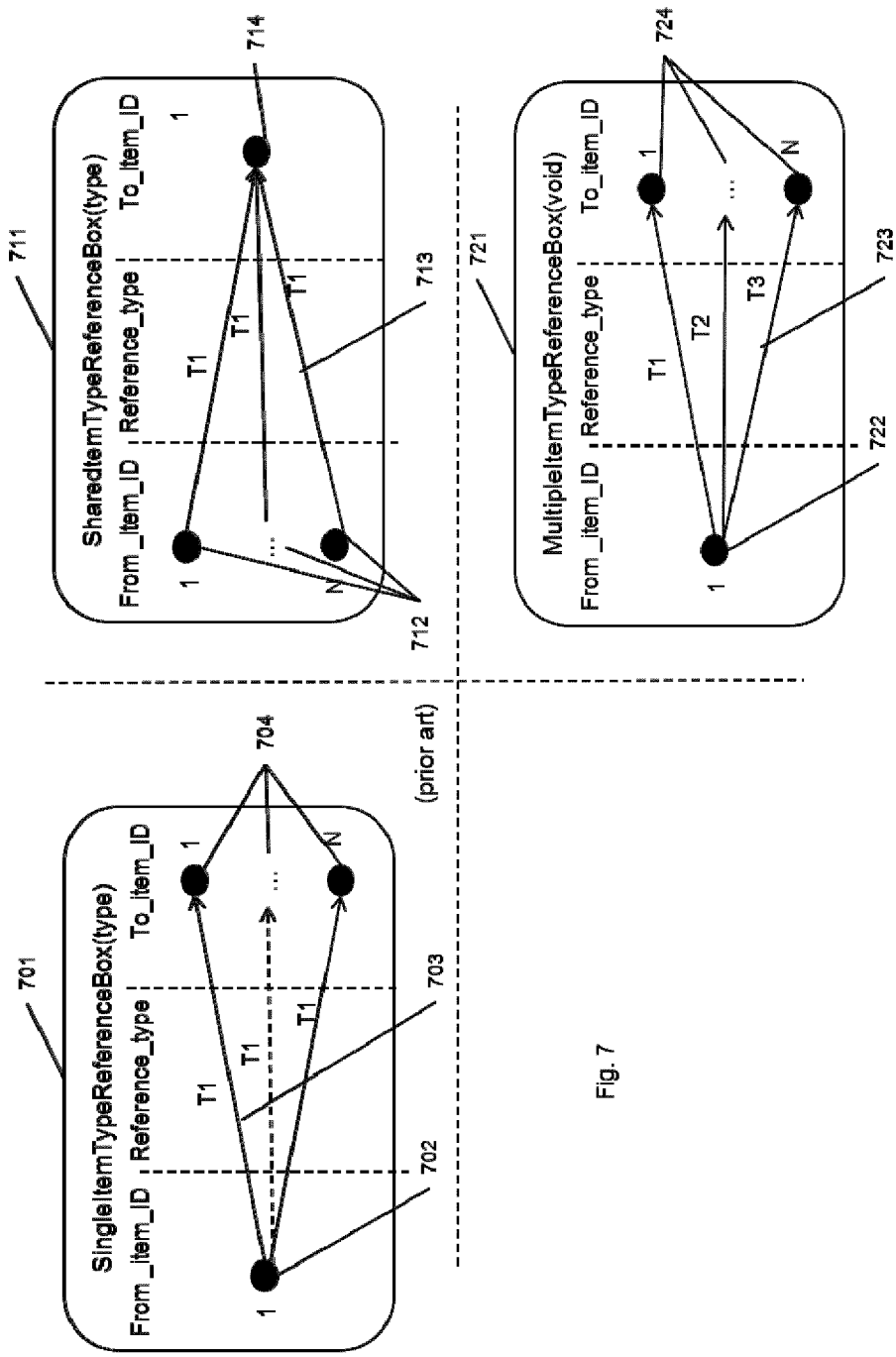
FIG. 7 illustrates the referencing mechanisms between information items.

The related information items have an index called for example "property_index". This "property_index" parameter associated with the "grouping_type" parameter enables a file format parser (or "reader") to identify either a reference to descriptive metadata or the descriptive metadata itself. FIG. 7 illustrates two exemplary embodiments.

The group feature in box "SingleItemTypeReferenceBox" 701 may be used with a group identification "group_ID" instead of the information item identification (item_ID) that is usually used for the value of the from_item_ID parameter. By design, the box "SingleItemTypeReferenceBox" makes it easier to find all the references of a specific kind or from a specific item. Using it with a "group_ID" instead of "item_ID" makes it possible to find for a group of items to easily identify all the references of a specific type. Advantageously, since there is at most one box "ItemInformationBox" per encapsulated file, there is no need to define group identifications. The encapsulation module (during encoding) and the parsing module (during decoding) can run a respective counter (as the "g" variable in the box "ItemInformationBox") on the list of information item groups as they are created or read. Alternatively, the parser may be informed, using the flag "group_used_flag", whether to maintain or not the group identification counter.

Back to the example with one group of information items corresponding to the tile pictures, one group may contain four entries and the reference 700 "SingleItemTypeReference" may indicate the list of information items 704 on which the four tile picture information items depend, and so for a particular reference type 703.

According to other exemplary embodiments, the information item is used in a new kind of box "ItemReferenceBox", as described hereinafter, that makes it possible, from one item 722, to list multiple reference types 723 to various other information items 724.

For the latter case, the specific box "ItemReferenceBox" 721 may be implemented as follows:

```
aligned(8) class MultipleItemTypeReferenceBox(void) extends Box(void) {
    unsigned int(16) from_item_ID;
    unsigned int(16) reference_count;
    for (j=0; j<reference_count; j++) {
        unsigned int(32) reference_type; // new parameter to allow multiple types
        unsigned int(16) to_item_ID;
    }
}
```

As for the standard box "ItemInformationBox", the list of item entries is described, but this time with a different order depending on the grouping. In the tile example, this may lead to a first group of four information items corresponding to the tile pictures gathered in a group with a parameter that may be named 'tile' followed by non-grouped information items for the configuration information, for the full picture information item and optionally for the EXIF metadata.

Thus, one box is modified and one box is created that is a specific kind of ItemReferenceBox. In what follows, this new kind of ItemReferenceBox is described.

The box "ItemReferenceBox" may also be extended by distinguishing between the various kinds of ItemReferenceBox by using the flag parameters in the box "FullBox" which is part of the ItemReferenceBox as follows:

```
aligned(8) class ItemReferenceBox extends FullBox('iref', 0, flags) {
switch (flags) {
case 0:
    SingleItemTypeReferenceBox references[ ];
    break;
case 1:
    MultipleItemTypeReferenceBox references[ ];
    break;
case 2:
    SharedItemTypeReferenceBox references[ ];
    break;
}
}
```

Using the box "MultipleItemTypeReferenceBox" 721, one picture with four tiles may be described as follows:

```
Item Reference Box (version=1 or flags=1):
    fromID=2, ref_count=1, type='cdsc', toID=1;
    fromID=1, ref_count=1, type='init', toID=3;
    fromID=4, ref_count=2, type='tbas', toID=1, type='tile' toID=8;
    fromID=5, ref_count=2, type='tbas', toID=1, type='tile' toID=8;
    fromID=6, ref_count=2, type='tbas', toID=1, type='tile' toID=8;
    fromID=7, ref_count=2, type='tbas', toID=1, type='tile' toID=8;
```

This design makes it fairly easier to find all the references of any kinds from a specific item.

Description support 711 for a list of items 712 referencing a same item 714 with a given type 713 may be as follows:

```
aligned(8) class SharedItemTypeReferenceBox(ref_type)extends Box(referenceType) {
    unsigned int(16) reference_count;
    for (j=0; j<reference_count; j++) {
        unsigned int(16) from_item_ID;
    }
    unsigned int(16) to_item_ID;
}
```

In the example of a picture with four tiles, then we may have:

```
type='cdsc', ref_count=1, fromID=2, toID=1;
type='init', ref_count=1, fromID=1, toID=3;
type='tbas', ref_count=4, fromID=4, fromID=5, fromID=6, fromID=7, toID=1;
type='tile', ref_count=4, fromID=4, fromID=5, fromID=6, fromID=7, toID=8;
```

The design of the box "SharedItemTypeReferenceBox" makes it easier to find all the references of a specific type pointing to a specific item. This is in contrast with box "SingleItemTypeReferenceBox". But since most of the "reference_type" defined for track references are not bi-directional, the box "SingleItemTypeReferenceBox" may not be used with some unidirectional reference type to signal all nodes having this reference type to other items. Alternatively, a flag may be provided in the "SingleItemTypeReference" for indicating whether it is a direct reference or a reverse reference, thereby alleviating the need for the new Shared ItemTypeReferenceBox.

In view of the above, an information item can be associated with tiling information. A description of this tiling information has now to be provided.

For example, each tile may be described using a tile descriptor, such as the "iref_parameter" 605 of the extended "IteminfoEntry" 601. A specific descriptor may be as follows:

```
aligned(8) class TileInfoDataBlock( ) {
    unsigned int(8) version;
    unsigned int(32) reference_width; // full image sizes
    unsigned int(32) reference_height;
    unsigned int(32) horizontal_offset; // tile positions
    unsigned int(32) vertical_offset;
    unsigned int(32) region_width; // tile sizes
    unsigned int(32) region_height;
}
```

According to embodiments, a descriptor may be used for the grid of tiles to apply to the one or more pictures to be stored.

Such descriptor may be as follows:

```
aligned(8) class TileInfoDataItem ( ) {
    unsigned int(8) version;
    unsigned int(1) regular_spacing;    // regular grid or not
    unsigned int(7) reserved = 0;
    unsigned int(32) reference_width;   // full-frame sizes
    unsigned int(32) reference_height;
    unsigned int(32) nb_cell_horiz;
    unsigned int(32) nb_cell_vert;
    if (!regular_spacing) {
```

```
        for (i=0; i<nb_cell_width; i++)
            unsigned int(16) cell_width;
        for (i=0; i<nb_cell_height; i++)
            unsigned int(16) cell_height;
        }
    }
}
```

This descriptor "TileInfoDataItem" allows describing a tiling grid (regular or irregular). The grid is described rows by rows starting from top-left.

The descriptor shall be stored as an item of type 'tile'. When another item refers to this item, it shall use a reference of type "tile" to this description and it shall have a parameter "iref_parameter" specified, whose value is the 0-based index of the cell in the grid defined by the descriptor, where 0 is the top-left item, 1 is the cell immediately to the right of cell 0 and so on.

In the descriptor:
  "version" indicates the version of the syntax for the TileInfoDataItem. Only value 0 is defined.
  "regular_spacing" indicates if all tiles in the grid have the same width and the same height.
  "reference_width, reference_height" indicates the units in which the grid is described. These units may or may not match the pixel resolution of the image which refers to this item. If the grid is regular, the "reference_width" (resp. "reference_height") shall be a multiple of "nb_cell_horiz" (resp. "nb_cell_vert").
  "cell_width" gives the horizontal division of the grid in non-regular tiles, starting from the left.
  "cell_height" gives the vertical division of the grid in non-regular tiles, starting from the top.

The above approach makes it possible to share the tiling information for all tiles.

Moreover, in case there are multiple pictures sharing the same tiling, even more description may be shared by simply referencing a cell in the grid of tiles.

The tiling configuration can be put in the media data box or in a dedicated box shared (by reference) among the tile information items.

The above descriptors are pure spatial descriptors in the sense that they only provide spatial locations and sizes for sub-image(s) in a greater image. In some use cases, for example with image collections or image composition, a spatial location is not enough to describe the image, typically when images overlap. This is one limitation of the TileInfoDataBlock descriptor above. In order to allow image composition, whatever the image i.e. a tile or an independent/complete image, it may be useful to define a descriptor that contains on the one hand the positions and sizes of the image (spatial relations) and on the other hand display information (color, cropping . . . ) for that picture. For example, color information can be provided to transform a sub-image from a color space to another one for display. This kind of information can be conveyed in the ColorInformationBox 'colr' of the ISOBMFF. It can be useful, for compacity, to have the same data prepared for different kinds of display just by providing the transformation parameters to apply rather than conveying the two different so-transformed pictures. As well, the pixel aspect ratio like PixelAspectRatio box 'pasp' defined in the ISOBMFF Part-12 can be put in this descriptor to redefine a width and height that can be different than the encoded width and height of each picture. This would indicate the scale ratio to apply by the display after the decoding of an image. We would then have the coded sizes stored in the video sample entries ('stsd' box for example) and the display sizes deduced from the 'pasp' box. Another possible information for display could be the clean aperture information box 'clap' also defined in ISOBMFF. According to standard SMPTE 274M, the clean aperture defines an area within which picture information is subjectively uncontaminated by all edge transient distortions (possible ringing effects at the borders of images after analog to digital conversions). This list of parameters useful for display is not limitative and we could put as optional components in the sub-image descriptor any other descriptive metadata box. These ones can be explicitly mentioned because they are already part of the standard and they provide generic tools to indicate image cropping, sample aspect ratio modification and color adjustments. Unfortunately their use was only possible for media tracks, not for image file format relying on 'meta' boxes. We then suggest a new descriptor called for example "SimpleImageMetaData" to support spatial description of image items, along with other properties such as clean aperture or sample aspect ratio. This applies to any sub-image (tile or independent image) intended to be composed in a bigger image or at the reverse extracted from a bigger image:

```
aligned(8) class SimpleImageMetaData {
    CleanApertureBox    clap; // optional
    PixelAspectRatioBox pasp; // optional
    ColourInformationBox colour; // optional
    ImageSpatialRelationBox location; // optional
}
```

Or its variation when considering extension parameters to help the display process (through for example extra_boxes):

```
aligned(8) class SimpleImageMetaData {
    CleanApertureBox         clap;     // optional
    PixelAspectRatioBox      pasp;     // optional
    ColourInformationBox     colour;   // optional
    ImageSpatialRelationBox  location; // optional
    extra_boxes              boxes;    // optional
}
```

Where the ImageSpatialRelationBox is an extension of the TileInfoDataBlock as described in the following. Another useful parameter to consider is the possibility to compose images as layers. We then suggest inserting a parameter to indicate the level associated to an image in this layered composition. This is typically useful when images overlap. This can be called 'layer' for example with layer information indication. An example syntax for such descriptor is provided:

Definition

| Box Type: | 'isre' |
|---|---|
| Container: | Simple image meta-data item ('simd') |
| Mandatory: | No |
| Quantity: | Zero or one per item |

Syntax:

```
aligned(8) class ImageSpatialRelationBox
extends FullBox('isre, version = 0, 0) {
    unsigned int(32) horizontal_display_offset;
    unsigned int(32) vertical_display_offset;
    unsigned int(32) display_width;
    unsigned int(32) display_height;
    int(16) layer;
}
``` with the associated semantics:

horizontal_display_offset specifies the horizontal offset of the image.

vertical_display_offset specifies the vertical offset of the image.

display_width specifies the width of the image.

display_height specifies the height of the image.

layer specifies the front-to-back ordering of the image; images with lower numbers are closer to the viewer. 0 is the normal value, and −1 would be in front of layer 0, and so on.

This new 'isre' box type gives the ability to describe the relative position of an image with other images in an image collection. It provides a subset of the functionalities of the transformation matrix usually found in the movie or track header box of a media file. Coordinates in the ImageSpatialRelationBox are expressed on a square grid giving the author's intended display size of the collection; these units may or may not match the coded size of the image. The intended display size is defined by:

Horizontally: the maximum value of (horizontal_display_offset+display_width) for all 'isre' boxes Vertically: the maximum value of (vertical_display_offset+display_height) for all 'isre' boxes When some images do not have any 'isre' associated while other images in the file have 'isre' associated, the default images without any 'isre' shall be treated as if their horizontal and vertical offsets are 0, their display size is the intended display size and their layer is 0.

The ImageSpatialRelationBox indicates the relative spatial position of images after any cropping or sample aspect ratio has been applied to the images. This means, when 'isre' is combined with 'pasp', etc in a SimpleImageMetaData, the image is decoded, the 'pasp', 'clap', 'coir' are applied if present and then the image is moved and scaled to the offset and size declared in the 'isre' box.

This new descriptor can be used as description of an image (tile or single image) by defining an association between the item information representing the image and the item information representing the descriptor (let's give the type 'simd' for SimpleImageMetadata Definition, any reserved 4 character code would be acceptable for a mp4 parser to easily identify the kind of metadata it is currently processing). This association is done with an ItemReferenceBox and with a new reference type; 'simr' to indicate "spatial image relation". The example description below illustrates the case of a composition of 4 images where the composition itself has no associated item. Each image item is associated to a SimpleImageMetaData item through an item reference of type 'simr' and shares the DecoderConfigurationRecord information in a dedicated 'hvcC' item.

```
ftyp box:   major-brand = 'hevc', compatible-brands = 'hevc'
meta box:   (container)
    handler box:   hdlr = 'hvc1'      // no primary item provided
    Item Information Entries:
item_type = 'hvc1', itemID=1, item_protection_index = 0
item_type = 'hvc1', itemID=2, item_protection_index = 0
item_type = 'hvc1', itemID=3, item_protection_index = 0
item_type = 'hvc1', itemID=4, item_protection_index = 0
item_type='simd' itemID=5 (sub-image descriptor)
item_type='simd' itemID=6 (sub-image descriptor)
item_type='simd' itemID=7 (sub-image descriptor)
item_type='simd' itemID=8 (sub-image descriptor)
item_type = 'hvcC', item_ID=9, item_protection_index = 0...
    Item Reference:
type='simr' fromID=1, toID=5
type='simr' fromID=2, toID=6
type='simr' fromID=3, toID=7
type='simr' fromID=4, toID=8
type='init', fromID=1, toID=9;
type='init', fromID=3, toID=9;
type='init', fromID=4, toID=9;
type='init', fromID=5, toID=9;
    Item Location:
itemID = 1, extent_count = 1, extent_offset = P1, extent_length = L1;
itemID = 2, extent_count = 1, extent_offset = P2, extent_length = L2;
itemID = 3, extent_count = 1, extent_offset = P3, extent_length = L3;
itemID = 4, extent_count = 1, extent_offset = P4, extent_length = L4;
itemID = 5, extent_count = 1, extent_offset = P5, extent_length = L5;
itemID = 6, extent_count = 1, extent_offset = P6, extent_length = L6;
itemID = 7, extent_count = 1, extent_offset = P7, extent_length = L7;
itemID = 8, extent_count = 1, extent_offset = P8, extent_length = L8;
itemID = 9, extent_count = 1, extent_offset = P0, extent_length = L0;
    Media data box:
    1 HEVC Decoder Configuration Record ('hvcC' at offset P0)
    4 HEVC Images (at file offsets P1, P2, P3, P4)
    4 simple image metadata (at file offsets P5, P6, P7, P8)
```

The above organization of data is provided as an example: image and metadata could be interlaced in the media data box for example to have an image plus its metadata addressable as a single byte range. When receiving this description, a parser is informed, by parsing the informations in the 'simd' items whether a sub-image is cropped from a full picture, or conversely if a full picture is a composition from sub-images. In case of crop, the full picture item and the cropped image would share the same data range as in example below and the same decoder configuration information. The sub-image would then then be associated to a 'simd' item having only 'clap' information and no positioning, then no 'isre'.

In case of composition: in such case, the full picture item is associated to a 'simd' item that only contains 'isre' information and the sub-image would be associated to a 'simd' item reflecting its position in the full image.

The example below illustrates the case where 4 images are composed into a larger one. All images, including the composed one are exposed as a playable item using the proposed descriptor.

```
ftyp box:   major-brand = 'hevc', compatible-brands = 'hevc'
meta box:   (container)
    handler box:   hdlr = 'hvc1'      primary item: itemID = 1;
    Item Information Entries:
item_type = 'hvc1', itemID=1, item_protection_index = 0... // full-image
item_type = 'hvc1', itemID=2, item_protection_index = 0... // sub-image
item_type = 'hvc1', itemID=3, item_protection_index = 0... // sub-image
item_type = 'hvc1', itemID=4, item_protection_index = 0... // sub-image
item_type = 'hvc1', itemID=5, item_protection_index = 0... // sub-image
```

```
item_type = 'simd' itemID=6 (sub-image descriptor)...
item_type = 'simd' itemID=7 (sub-image descriptor)...
item_type = 'simd' itemID=8 (sub-image descriptor)...
item_type = 'simd' itemID=9 (sub-image descriptor)...
item_type = 'hvcC', item_ID=10 (decoder config record)
item_type = 'simd', item_ID=11 (sub-image descriptor)
    Item Reference Entries:
type= 'simr', fromID=1, toID=11
type= 'simr', fromID=2, toID=6
type= 'simr', fromID=3, toID=7
type= 'simr', fromID=4, toID=8
type= 'simr', fromID=5, toID=9
type= 'init', fromID=1, toID=10...
type= 'init', fromID=2, toID=10...
type= 'init', fromID=3, toID=10...
type= 'init', fromID=4, toID=10...
type= 'init', fromID=5, toID=10...
    Item Location:
itemID = 1, extent_count = 4,// full image is composed of 4 sub-images
    extent_offset = P2, extent_length = L2;
    extent_offset = P3, extent_length = L3;
    extent_offset = P4, extent_length = L4;
    extent_offset = P5, extent_length = L5;
itemID = 2, extent_count = 1, extent_offset = P2, extent_length = L2;
itemID = 3, extent_count = 1, extent_offset = P3, extent_length = L3;
itemID = 4, extent_count = 1, extent_offset = P4, extent_length = L4;
itemID = 5, extent_count = 1, extent_offset = P5, extent_length = L5;
itemID = 6, extent_count = 1, extent_offset = P6, extent_length = L6;
itemID = 7, extent_count = 1, extent_offset = P7, extent_length = L7;
itemID = 8, extent_count = 1, extent_offset = P8, extent_length = L8;
itemID = 9, extent_count = 1, extent_offset = P9, extent_length = L9;
itemID = 10, extent_count = 1, extent_offset = P0, extent_length = L0;
itemID = 11, extent_count = 1, extent_offset = P10, extent_length = L10;
    Media data box:
    1 HEVC Decoder Configuration Record ('hvcC' at offset P0)
    4 HEVC (sub) Images (at file offsets P2, P3, P4, P5)
    5 simple image metadata (at file offsets P6, P7, P8, P9, P10)
```

This other example illustrates the case where the full picture is actually a tiled HEVC picture (4 tiles):

```
ftyp box:   major-brand = 'hevc', compatible-brands = 'hevc'
meta box:   (container)
    handler box:   hdlr = 'hvc1'   primary item: itemID = 1;
    Item Information Entries:
item_type = 'hvc1', itemID=1, item_protection_index = 0... // full-image
item_type = 'hvt1', itemID=2, item_protection_index = 0... // sub-image
item_type = 'hvt1', itemID=3, item_protection_index = 0... // sub-image
item_type = 'hvt1', itemID=4, item_protection_index = 0... // sub-image
item_type = 'hvt1', itemID=5, item_protection_index = 0... // sub-image
item_type = 'simd', itemID=6 (sub-image descriptor)...
item_type = 'simd', itemID=7 (sub-image descriptor)...
item_type = 'simd', itemID=8 (sub-image descriptor)...
item_type = 'simd', itemID=9 (sub-image descriptor)...
item_type = 'hvcC', item_ID=10 (decoder config record)
    Item Reference Entries:
type= 'init', fromID=1, toID=10...
// declare sub-images as tiles of the full image
type= 'tbas', fromID=2, toID=1...
type= 'tbas', fromID=3, toID=1...
type= 'tbas', fromID=4, toID=1...
type= 'tbas', fromID=5, toID=1...
// providing positions and sizes
type= 'simr', fromID=2, toID=6
type= 'simr', fromID=3, toID=7
type= 'simr', fromID=4, toID=8
type= 'simr', fromID=5, toID=9
    Item Location:
itemID = 1, extent_count = 4,// full image is composed of 4 tiles
    extent_offset = P2, extent_length = L2... // data for tile 1
    extent_offset = P3, extent_length = L3... // data for tile 2
    extent_offset = P4, extent_length = L4... // data for tile 3
    extent_offset = P5, extent_length = L5... // data for tile 4
itemID = 2, extent_count = 1, extent_offset = P2, extent_length = L2;
itemID = 3, extent_count = 1, extent_offset = P3, extent_length = L3;
itemID = 4, extent_count = 1, extent_offset = P4, extent_length = L4;
itemID = 5, extent_count = 1, extent_offset = P5, extent_length = L5;
itemID = 6, extent_count = 1, extent_offset = P6, extent_length = L6;
itemID = 7, extent_count = 1, extent_offset = P7, extent_length = L7;
itemID = 8, extent_count = 1, extent_offset = P8, extent_length = L8;
itemID = 9, extent_count = 1, extent_offset = P9, extent_length = L9;
itemID = 10, extent_count = 1, extent_offset = P0, extent_length = L0;
    Media data box:
    1 HEVC Decoder Configuration Record ('hvcC' at offset P0)
    1 HEVC Image (with 4 tiles at file offsets P2, P3, P4, P5)
    4 simple image metadata (at file offsets P6, P7, P8, P9)
```

Depending on use cases, it would be possible to have several image items sharing the same metadata, for example when the same cropping is to be applied to all images. It is also possible for an image item to have multiple 'simr' references to different SimpleImageMetaData, for example when cropping is shared among images but not spatial information.

An alternative embodiment to the new version of the ItemInfoEntry (as illustrated in FIG. 6) is to define more than one parameter (605) per information item entry and reference. In the embodiment of FIG. 6, the iref_parameter is a four bytes code that is useful in case of a tile index to refer to a cell in a tiling grid. But in order to have richer description and to be able to embed linked description inside the item info entry itself rather than with the data (in mdat box), the following extension can be useful:

```
if (version == 4) {
    unsigned int(32) item_iref_parameter_count;
    for (i=0 ; i< item_iref_parameter_count ; i++) {
        unsigned int(32) iref_type;
        ItemReferenceParameterEntry parameter;
    }
}
aligned(8) abstract class ItemReferenceParameterEntry (unsigned int(32) format)
    extends Box(format){
}
// Example to reference a tile index
aligned(8) abstract class TileIndexItemReferenceParameterEntry
    extends ItemReferenceParameterEntry('tile'){
unsigned int(32) tile_index;
}
// Example to inline the tile description
aligned(8) abstract class TileIndexItemReferenceParameterEntry
    extends ItemReferenceParameterEntry('tile'){
    unsigned int(32) tile_index;
}
```

In the above extension:

item_iref_parameter_count gives the number of reference types for which a parameter is given. This is unchanged compared to item 605 in FIG. 6, iref_type gives the reference type, as indicated in the 'iref' box, for which the parameter applies for this item. This is unchanged compared to item 605 in FIG. 6.

parameter here differs from iref_parameter (item 605 in FIG. 6) because it provides an extension means via the new box ItemReferenceParameterEntry. By specializing this new box (as done above with TileIndexItemReferenceParameterEntry for tile index in a tiling configuration), any kind of additional metadata can be associated with an information item entry provided that the encapsulation and the parsing modules are aware of the structure of this specialized box. This can be done by standard types of ItemReferenceParameterEntry or by providing by construction or in a negotiation step the structure of the parameter entry. The semantics of the parameter is given by the semantics of the item with type iref_type.

In what follows, there are provided exemplary descriptive metadata for information items describing a picture with 4 tiles and the EXIF meta data of the full picture.

In the prior art, the tile pictures were listed as information items without any corresponding description provided as show herein below. Moreover, the setup information denoted 'hvcC' type was not described as an item. This makes it possible to factorize the common data related to HEVC parameter sets and SEI messages that apply to all tile pictures and to the full picture.

--- ftyp box: major-brand = 'hevc', compatible-brands = 'hevc'
meta box: (container)
    handler box: hdlr = 'hvc1'    primary item: itemID = 1;
    Item information:
item_type = 'hvc1', itemID=1, item_protection_index = 0 (unused) => Full pict.
item_type = 'Exif', itemID=2, item_protection_index = 0 (unused)
item_type = 'hvcC', itemID=3, item_protection_index = 0 (unused)
item_type = 'hvct', itemID=4, item_protection_index = 0 (unused) => Tile pict.
item_type = 'hvct', itemID=5, item_protection_index = 0 (unused) => Tile pict.
item_type = 'hvct', itemID=6, item_protection_index = 0 (unused) => Tile pict.
item_type = 'hvct', itemID=7, item_protection_index = 0 (unused) => Tile pict.
    Item Location:
itemID = 1, extent_count = 1, extent_offset = X, extent_length = Y;
itemID = 2, extent_count = 1, extent_offset = P, extent_length = Q;
itemID = 3, extent_count = 1, extent_offset = R, extent_length = S;
itemID = 4, extent_count = 1, extent_offset = X, extent_length = ET1;
itemID = 5, extent_count = 1, extent_offset = X+ET1, extent_length = ET2;
itemID = 6, extent_count = 1, extent_offset = X+ET2, extent_length = ET3;
itemID = 7, extent_count = 1, extent_offset = X+ET3, extent_length = ET4;
    Item Reference:
type='cdsc', fromID=2, toID=1;
type='init', fromID=1, toID=3;
type='tbas', fromID=4, toID=1;
type='tbas', fromID=5, toID=1;
type='tbas', fromID=6, toID=1;
type='tbas', fromID=7, toID=1;
Media data box:
    HEVC Image (at file offset X, with length Y)
    Exif data block (at file offset P, with length Q)
    HEVC Config Record (at file offset R, with length S)
    // No Tile description

---

According to embodiments, using the extension with version 4 (see FIG. 6, 602, 603) of IteminfoEntry box (601): tile picture information is listed with associated references to parts of the tiling configuration that is also described as an information item (ID=8).

--- ftyp box: major-brand = 'hevc', compatible-brands = 'hevc'
meta box: (container)
    handler box: hdlr = 'hvc1'    primary item: itemID = 1;
    Item information:
item_type = 'hvc1', itemID=1, item_protection_index = 0 (unused)
item_type = 'Exif', itemID=2, item_protection_index = 0 (unused)
item_type = 'hvcC', itemID=3, item_protection_index = 0 (unused)
item_type = 'hvct', itemID=4, parameter for ireftype==tile: tile_index=0
item_type = 'hvct', itemID=5, parameter for ireftype==tile: tile_index=1
item_type = 'hvct', itemID=6, parameter for ireftype==tile: tile_index=2
item_type = 'hvct', itemID=7, parameter for ireftype==tile: tile_index=3
item_type = 'tile', itemID=8, (tiling configuration)
    Item Location:
itemID = 1, extent_count = 1, extent_offset = X, extent_length = Y;
itemID = 2, extent_count = 1, extent_offset = P, extent_length = Q;
itemID = 3, extent_count = 1, extent_offset = R, extent_length = S;
itemID = 4, extent_count = 1, extent_offset = X, extent_length = ET1;
itemID = 5, extent_count = 1, extent_offset = X+ET1, extent_length = ET2;
itemID = 6, extent_count = 1, extent_offset = X+ET2, extent_length = ET3;
itemID = 7, extent_count = 1, extent_offset = X+ET3, extent_length = ET4;
itemID = 8, extent_count = 1, extent_offset = i, extent_length = I;
    Item Reference:
type='cdsc', fromID=2, toID=1;
type='init', fromID=1, toID=3;
type='tbas', fromID=4, toID=1;
type='tbas', fromID=5, toID=1;
type='tbas', fromID=6, toID=1;
type='tbas', fromID=7, toID=1;
type='tile', fromID=4, toID=8; //
type='tile', fromID=5, toID=8; // link each tile pict.
type='tile', fromID=6, toID=8; // to the tiling config item
type='tile', fromID=7, toID=8; //
Media data box:
    HEVC Image (at file offset X, with length Y)
    Exif data block (at file offset P, with length Q)
    HEVC Config Record (at file offset R, with length S)
    Tile description data block (at file offset i, with length I)

---

Figure 8:
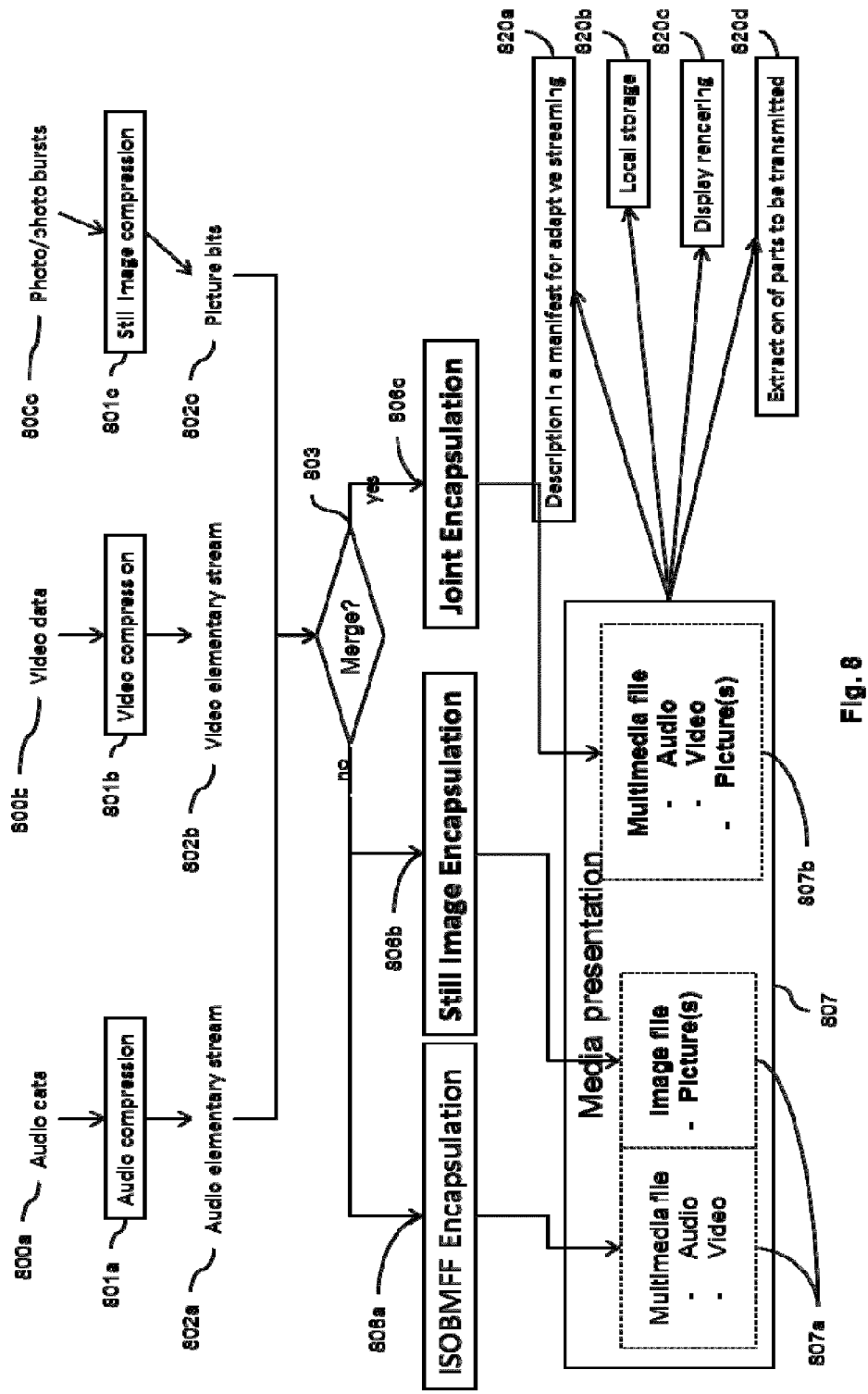
FIG. 8 illustrates a context of implementation of embodiments of the invention.

FIG. 8 illustrates a context of implementation of embodiments of the invention. First different media are recorded: for example audio during step 800a, video during step 800b and one or more pictures during step 800c. Each medium is compressed during respective steps 801a, 801b and 801c. During these compression steps elementary streams 802a, 802b and 802c are generated. Next, at application level (user selection from graphical user interface; configuration of the multimedia generation system etc.), an encapsulation mode is selected in order to determine whether or not all these elementary streams should be merged or not. When the "merge" mode is activated (test 803, "yes"), data for audio, video and still images are encapsulated in the same file during step 806c as described hereinabove. If the "merge" mode is not activated (test 803, "no"), then two encapsulated files are generated during steps 806a and 806b consecutively or in parallel thereby respectively leading to the creation of one file for synchronized time media data during step 807a and an additional file with only the still images 907b. During step 806a, audio and video elementary streams are encapsulated according to the ISOBMFF standard and the still pictures are encapsulated during step 806b as described herein above in order to provide tile description and region of interest features. Finally, a media presentation 807 is obtained and can be provided to a DASH generator to prepare it for streaming (step 820a) or stored into a memory (step 820b) or rendered on a display unit (step 820c) or transmitted (step 820d) to a remote entity either entirely or after some parts (such as tiles), have been extracted by parsing the descriptive metadata.

According to previous descriptions of embodiments it is to be noted that descriptive meta-data such as for example SimpleImageMetadata ('simd') box (also called ISOBMFF-MetaData in the last version of the Still Image File Format specification) are described as full-blown items. Additional descriptive or prescriptive meta-data are also defined by the Still Image File Format specification as described in document w14878, committee draft study of ISO/IEC 23008-12: 2013 1$^{st}$ edition, "Information technology—MPEG systems technologies—Part 12: Image File Format", MPEG 110 Strasbourg October 2014. Examples of descriptive or prescriptive meta-data are CleanApertureBox ('clap'), ImageRotation (Iron, ExifDataBlock ('exif'), or ImageOverlay ('iovr'). More generally descriptive meta-data are meta-data that provides additional information or description for an item like an image or a sub-image (e.g. Exif metadata), and prescriptive meta-data are operations or transformation to be applied to an item (e.g. a rotation, a crop or a combination of several items forming the transformation operators).

However, it may seem quite annoying having to store such descriptive or prescriptive meta-data in the specification as full-blown items; these are just pseudo-items, requiring that descriptive or prescriptive meta-data be stored with encoded data in mdat box (110), and requiring to define entries in itemLocationBox (iloc) (109), itemInfoBox (iinf) and itemProtectionBox (ipro). Requiring those entries in iloc, iinf and ipro for this is quite an overhead. For instance, an entry in itemInfoBox requires the use of a full box with a least a 12-bytes header, in addition an item_protection_index (16 bits) plus an empty item_name (8 bit) must be defined for a total of 15 bytes of extra cost per entry in itemInfoBox (iinf). An entry in itemLocationBox (iloc) also requires at least 9 bytes in better cases (base_offset_size=offset_size=length_size=1, 1 extent). In practice, the itemLocationBox entry is used with base_offset_size=offset_size=length_size=2 or 4, meaning 12 or 18 bytes of extra cost. Furthermore, this metadata is usually small and enables efficient reading of the other items. Having them stored as dedicated items may complicate file parsing, especially partial fetching of a file (multiplication of HTTP requests for example).

In alternative embodiment, all descriptive and prescriptive meta-data can be defined as embedded items which can be stored in the meta box (100) as part of other boxes rather than in mdat box (110) and thus which can avoid the extra cost of defining item InfoBox and itemLocationBox entries.

In order to store descriptive and prescriptive meta-data in the meta box, a virtual item box called VirtualItemBox' is defined. According to this embodiment, all descriptive and prescriptive meta-data box are inherited from this virtual item class.

A virtual item has an item_ID and item_type assigned to it, along with a set of boxes. Virtual items are additional data typically used to describe meta-data to be associated with other items. For example, the Virtual item allows associating an entry of the itemInfoBox identifying an item (image or sub-image) and the operation or the transformation to be applied to this item. Typically, this association can be described by defining an entry of type 'simr' in the itemReferenceBox from the item_ID of the image to the item_ID of the meta-data operation or transformation description box. Virtual items may only be referenced in item reference boxes and primary item boxes, and shall not be declared or referenced in any other box (e.g. itemLocationBox (iloc), itemInfoBox (iinf), itemProtectionBox (ipro)). The VirtualItemBox' is defined as follows:

```
aligned(8) class VirtualItemBox(unsigned int(32) item_type)
    extends FullBox('vite', version, 0) {
    if (version == 0) {
        unsigned int(16) item_ID;
```

```
    } else {
        unsigned int(32) item_ID;
    }
    unsigned int(32) item_type;
}
``` with following semantics for its parameters:

item_ID: ID (or identifier) of this item. it is illegal to have entries in iinf, iloc or ipro with an item_ID value with the same item_type is a 32-bit value, typically 4 printable characters, that is a defined valid item type indicator, such as 'mime'.

Optionally, in a variant, the VirtualItemBox' can also include an additional parameter called "descriptor_family". The Descriptor family indicates whether the meta-data box is a descriptive or a prescriptive meta-data. In a variant, descriptor family indicates the type of meta-data box from a list of pre-defined values. For example: transfo_operator, composed_image, descriptive_metadata . . .

By inheriting from this virtual item box, all descriptive and prescriptive meta-data boxes can be stored in meta box without the need to define associated entries in itemInfoBox (iinf) and itemLocationBox (iloc) but they still keep the advantage of being addressable by item reference boxes.

According to this embodiment, ImageOverlay (iovl), SubSampleItemData (subs), AuxiliaryConfiguration (auxC), ExifDataBlock (exif), SimpleImageMetadata (simd) and derived image item are inheriting from the virtual item class.

Still according to this embodiment, a single, generic item type called 'dimg', with item references of type 'simr' to items of types 'simd' is introduced. This approach enables the reuse of properties when appropriate and reduces the number of items and item references. The ImageRotationBox is added into the SimpleImageMetadata (simd). The 'simr' reference type defines a link from an image item toward a 'simd' item, so as to provide direct access to image descriptive metadata.

In addition, ImageOverlay (iovl) meta-data box is redesigned as follows so that it is no more dependent on reference order.

```
aligned(8) class ImageOverlay {
    unsigned int(8) version = 0;
    unsigned int(8) flags;
    for (j=0; j<3; j++) {
        unsigned int(16) canvas_fill_value;
    }
    FieldLength = ((flags & 1) + 1) * 16;
    unsigned int(FieldLength) output_width;
    unsigned int(FieldLength) output_height;
    for (i=0; i<reference_count; i++) {
        unsigned int(16) item_id;
        signed int(FieldLength) horizontal_offset;
        signed int(FieldLength) vertical_offset;
    }
}
```

An explicit item_id is added for each entry in the loop to explicitly identifiy the item that is composed.

In alternative embodiment, all boxes included into SimpleImageMetadata (simd) are defined as independent meta-data boxes that inherited from the Virtual Item box.

In alternative embodiment, simple image rotation can be declared by integrating the rotation operation directly in the image metadata descriptor SimpleImageMetadata ('simd')

box (also called ISOBMFFMetaData in the last version of the Still Image File Format specification) as follows:

```
aligned(8) class ISOBMFFMetaData {
    CleanApertureBox clap;              // optional
    PixelAspectRatioBox pasp;           // optional
    ColourInformationBox colour;        // optional
    ImageSpatialRelationBox location;   // optional
    ImageRotationBox rotation;          // optional
    Box extra_boxes[ ];                 // optional
}
aligned(8) class ImageRotationBox
    extends FullBox('irot', version = 0, flags = 0) { // 12
extra-bytes
    unsigned int (6) reserved = 0;
    unsigned int (2) angle;
}
```

Although the rotation box is slightly bigger than the 'irot' items (12 bytes), the benefit of using this approach is clear when combining transformations, such as rotation and CleanApperture, since only one 'simd' is needed, rather than a cascade of derived items.

In such a case, the generic derived item, 'dimg' (described above), can be used to reference both the image item and the metadata description. Such an item could then be listed as a primary item in PrimaryItemBox ('pitm').

Another benefit of this approach is that an author can clearly indicate that it only wants the rotated item to be displayed.

The following paragraphs propose an alternative to the embodiment described above. This alternative is advantageously simple concerning how the transformations (or "effects") can be applied to images in the ISO Still Image file format. In particular, the following issues are settled with this alternative embodiment:

the high number of item references;
the growing number of items when cascading effects; and
the impossibility to mutualize the effects for a given set of items, meaning set of images or portions of images like Region Of Interest.

Existing solutions proposed to mutualize the effects as different extents (meaning byte offsets in the data part) of the item. More in detail extent means that a derived image would be described as a list of extents in the itemLocationBox ("iloc"), each extent identifying a fragment of the data part ('mdat'), each fragment corresponding to one or more descriptive or prescriptive or transformation metadata.

But several drawbacks are inherent to this solution:
the authoring of an encapsulated image file gets quite complicated: touching one effect in one derived image item implies inspecting all derived images to check if they share the same extent, and potentially rewrite part of it;
the parsing is not very simple either as the image file reader will need to figure out whether a chain of transformations/effects is the same on different items in said file (no direct signaling);
for each transformation/effect a new extent will be needed in the itemLocationBox ("iloc") whenever the new transformation/effect is not continuously stored with the transformation/effect in the chain of transformations/effects to apply. Moreover, combination or cascading of effects may be costly when not stored on contiguous extents in the data part.

Moreover, these solutions required implementation storage which implies the creation of a box for storing effect, in order to understand its type (until now, the type of the effect was given by the item_type). By defining a new box format for the effect, a simpler solution is to define effects separately from items and have a direct mapping between items and effects without any additional cost.

The alternative embodiment proposes a simplification of the effect handling by having a clean separation in the file formats:

regular items (images or portions of images) (eg: hvc1, . . . ) linked with their descriptive metadata (as proposed above: either through 'init' or 'simr' reference type or any reference type describing descriptive metadata);

"derived images", which are a collection of effects (or transformations) applied to one or more source items (image or portion of image) identified through a 'dimg' item reference from the "derived image" item to the source item; and a structure representing the transformations/effects, including a collection of several different effects.

The advantages of this alternative embodiment are:
the reusability of effects: declared once and potentially referenced multiple times
more compact descriptions by defining collection of effects (more on that below);
overall readability including that no new extents of the itemLocationBox are needed; and
keeping the number of item references small.

According to this alternative embodiment, a new single derived item is defined with item type 'dimg'. This single derived item is concretely represented by:

```
aligned(8) class DerivedImage {
    bit(2) index_mode;
    bit (6) reserved;
    if (index_mode==0) nb_bits_effect = 8;
    else if (index_mode==1) nb_bits_effect = 16;
    else if (index_mode==2) nb_bits_effect = 32;
    unsigned int (nb_bits_effect) nb_effects;
    for (i=0; i<nb_effects; i++) {
        unsigned int (nb_bits_effect) effect_id;
    }
}
```

Where nb_effects represents the number of effects to be applied to a source image in order to compose the derived image and effect_id is a unique identifier in the encapsulated file of the effect to apply. Effects are applied in the reverse order of their appearance in the list of effects.

The derived image or transformed item named "DerivedImage" defines an image as a set of effects to be applied to a source image before presenting it to a user or a display screen for example. The source image is identified by an item reference of type 'dimg' (or any reserved reference type) from the derived item to the source image. The source image may itself be any image item (images or portions of images, image overlay, derived image) defined in the ISO Still Image File Format specification. There shall not be more than one 'dimg' item reference from the same item (but there can be multiple on the same item, if this item is reused several times for various compositions).

The derived image is stored in the data part of the file.
When editing the encapsulated file, for example removing an effect from an image file, all references to this effect should be removed from derived images.

The effects can be applied to images, portion of images, composed image or derived image through DerivedImage items. Each effect is described by a box deriving from a BaseEffectBox structure illustrated below.

```
class BaseEffetBox(effect_type) extends
    FullBox(effect_type, version, flags){
        if (version==0) nb_bits_effect = 8;
        else if (version ==1) nb_bits_effect = 16;
        else if (version ==2) nb_bits_effect = 32;
        unsigned int(nb_bits_effect) effect_id;
    }
```

With the following semantics:
effect_type is the box type of effects deriving from this class, a unique four character code identifying the kind of box;
effect_id is a unique identifier for a given effect or transformation. This identifier shall be unique within the 'meta' box.
nb_bits_effect is derived from the version value and indicates the number of bits used for representing the effect_id.

Effects may be declared in an optional EffectDeclarationBox, contained in the 'meta' box:

```
BoxType:        'effd'
Container:      meta
Mandatory:      No
Quantity: Zero or One
class EffectDeclarationBox extends Box('effd'){
    //one or more effect boxes
}
```

For example, the following effects may be defined (no restrictive list):
  the Rotation Effect: the rotation effect transforms the source image in anti-clockwise direction in units of 90 degrees.

```
BoxType:        'erot '
Container:      effd
Mandatory:      No
Quantity: Zero or More
class RotationEffectBox extends BaseEffectBox('erot'){
    unsigned int (6) reserved = 0;
    unsigned int (2) angle;
}
```

The semantic is:
angle * 90: it specifies the angle (in anti-clockwise direction) in units of degrees
  the Clean Aperture Effect: the clean aperture effect modifies the visible part of the source image.

```
BoxType:        'ecla'
Container:      effd
Mandatory:      No
Quantity: Zero or More
class  CleanApertureEffectBox  extends BaseEffectBox('ecla'){
    unsigned int(nb_bits_effect) cleanApertureWidthN;
    unsigned int(nb_bits_effect) cleanApertureWidthD;
    unsigned int(nb_bits_effect) cleanApertureHeightN;
    unsigned int(nb_bits_effect) cleanApertureHeightD;
    unsigned int(nb_bits_effect) horizOffN;
    unsigned int(nb_bits_effect) horizOffD;
    unsigned int(nb_bits_effect) vertOffN;
    unsigned int(nb_bits_effect) vertOffD;
}
```

The semantics are:
nb_bits_effect is derived from parent class BaseEffectBox and indicates the number of bits used for representing the different fields of the CleanApertureEffectBox;
hSpacing, vspacing: define the relative width and height of a pixel;
cleanApertureWidthN, cleanApertureWidthD: a fractional number which defines the exact clean aperture width, in counted pixels, of the image;
cleanApertureHeightN, cleanApertureHeightD: a fractional number which defines the exact clean aperture height, in counted pixels, of the image;
horizOffN, horizOffD: a fractional number which defines the horizontal offset of clean aperture centre minus (width-1)/2 (typically 0);
vertOffN, vertOffD: a fractional number which defines the vertical offset of clean aperture centre minus (height-1)/2 (typically 0).

The Effect Collection: the Effect Collection box allows defining a set of several effects as a single effect, in order to reuse it for several images and thus reducing description cost in terms of bytes.

```
Box Type:       'ecol'
Container:      effd
Mandatory:      No
Quantity: Zero or More.
class EffectCollectionBox extends BaseEffectBox('ecol')
{
    unsigned int(nb_bits_effect) nb_effects;
    for (i=0; i<nb_effects; i++) {
        unsigned int(nb_bits_effect) apply_effect_id;
    }
}
```

The semantic is:
nb_bits_effect is derived from parent class BaseEffectBox and indicates the number of bits used for representing the different fields of the EffectCollectionBox.
apply_effect_id: indicates the ID of an effect to apply to the source image.

Effects in an Effect Collection are applied in the same order as effects in the DerivedImaged item; e.g. each effect shall be applied to the input in the reverse order of their appearance in the list of effects.

The OverlayEffectBox declares a composition of images as an overlay. For this specific effect, the resulting derived image has no reference to any source image since this effect declares the list of source images that are part of the composition.

```
class OverlayEffectBox extends BaseEffectBox('eovl'){
    bit(1) fill_required;
    bit(7) reserved;
    if (fill_required) {
        for (j=0; j<3; j++) {
            unsigned int(nb_bits_effects) canvas_fill_value;
        }
    }
    unsigned int(nb_bits_effects) output_width;
    unsigned int(nb_bits_effects) output_height;
    unsigned int(nb_bits_effects) nb_images;
    for (i=0; i<nb_images; i++) {
        unsigned int (nb_bits_effects) image_item_ID;
        signed int(nb_bits_effects) horizontal_offset;
        signed int(nb_bits_effects) vertical_offset;
    }
}
``` with the following semantics:
nb_bits_effects is derived from parent class BaseEffectBox and indicates the number of bits used for representing the different fields of the OverlayEffectBox;
fill_required indicates whether there are holes in the resulting composed image to fill with a background value;

canvas_fill_value: indicates the pixel value per channels used if no pixel of any input image is located at a particular pixel location. If the input images contain fewer than three channels, the semantics of canvas_fill_value corresponding to the channels that are not present in the input images is unspecified;
  nb_images indicates the number of images to compose, each identified by their item_ID as indicated by image_item_ID parameter.
  output_width, output_height: Specify the width and height, respectively, of the output image on which the input images are placed. The picture area of the output image is referred to as the canvas.
horizontal_offset, vertical_offset: Specifies the offset, from the top-left corner of the canvas, to which the input image is located. Pixel locations with a negative offset value are not included in the output image. Horizontal pixel locations greater than or equal to output_width are not included in the output image. Vertical pixel locations greater than or equal to output_height are not included in the output image.

According to another aspect of the invention, the storage of all descriptive and prescriptive meta-data can be further optimized compared to above embodiments depending on if the descriptive or/and prescriptive meta-data are specific to a particular image item or shared between several image items. Such sharing is made possible without using sharing of byte ranges or without defining an extensive list of item references as required by above embodiments. According to this alternative embodiment, all descriptive and prescriptive meta-data are still only stored inside the box hierarchy in the 'meta' box (100) allowing ISOBMFF readers to parse all system information without having to fetch an 'idat' or 'mdat' box. The number of image items (in 'inf' box) and item references (in 'iref' box) are thus limited to only address media data or to represent relationship between several image items. Such design makes the parsing of the file simpler and eases the high-level understanding of the file format.

A key aspect of this embodiment is that all system-level item information is boxed in dedicated boxes (using ISOBMFF fullbox), accessible to a parser without fetching any 'mdat' or 'idat' box and included in or referred by the item information entry directly.

This embodiment introduces following changes:
  a new dedicated box called SharedItemPropertiesBox ('sitp') is defined to contain box-structured descriptive and prescriptive meta-data that is shared among items.
  a modification of the Item Info Entry ('infe') to associate box-structured descriptive and prescriptive meta-data with an item. That meta-data may be directly stored in the 'infe' box if the meta-data is only related to this item or stored in the 'sitp' box and referenced from the 'infe' box if the meta-data is shared among several items.
  a new box (SampleDescriptionEntryReference 'sder' representing an initialization parameter) to allow sharing of the same initialization data between an image item and a sample in a track.

The new box called SharedItemPropertiesBox ('sitp') is defined as follows:
Box Type: 'sitp'
Container: MetaBox ('meta')
Mandatory: No
Quantity: Zero or One The Shared Item Properties box (the dedicated shared box) contains a list of boxes defining descriptive (display parameters) and prescriptive (transformation operators) meta-data (also called properties) that may be applicable to several items declared in the parent 'meta' box. These boxes are referenced by a 0-based index from an IteminfoEntry box. This box has the following syntax:

```
aligned(8) class SharedItemPropertiesBox extends
Box('sitp') {
    // one or more boxes
}
```

Regarding modification of the Item Info Entry, a new version (4) is defined with following semantics: The IteminfoEntry box provides the possibility to include or to reference additional boxes in the item info entry that provide properties for this item. There shall be at most one property of a given type in the union of the included and referenced properties. Properties may be order-dependent in which case the order given in the IteminfoEntry box shall be used, i.e. the first included property is applied first, followed in order by all other included properties, followed then by all referenced properties.

The additional syntax is specified as follows:

```
if (version == 4) {
    unsigned int(16) included_prop_count;
    Box item_properties[included_prop_count];
    unsigned int(16) indexed_prop_count;
    unsigned int(16) box_prop_idx[indexed_prop_count];
}
```

The associated semantics are:
included_prop_count: number of properties (descriptive or prescriptive meta-data) included into the array item_properties.
item_properties: array of boxes or table of boxes providing additional information for this item (properties of the item information). The allowed boxes are the same as in the Shared ItemProperties Box.
indexed_prop_count: number of references to properties in the SharedItemProperties box.
box_prop_idx: 0-based indices to the list of boxes stored in the SharedItemProperties box of the 'meta' box.

According to this embodiment all descriptive and prescriptive meta-data are ISOBMFF full-boxes to be stored into SharedItemProperties box or into item_properties array within an ItemInfoEntry box.

For instance, the prescriptive meta-data for image rotation is defined as follows:
Box Type: 'irot'
Container: SharedItemProperties
Mandatory: No
Quantity: Zero or more.

The Image Rotation Box provides a rotation angle in anti-clockwise direction in units of 90 degrees. There shall be only one such box assigned as property of an image item. The syntax of this box is defined as follows:

```
aligned(8) class ImageRotationBox extends
FullBox('irot', version, flags) {
    unsigned int (6) reserved = 0;
    unsigned int (2) angle;
}
```

With the following attribute semantics:
version shall be equal to 0.
flags shall be equal to 0.
angle * 90 specifies the angle (in anti-clockwise direction) in units of degrees The prescriptive meta-data for image overlay is defined as follows:
Box Type: 'iovl'
Container: SharedItemProperties
Mandatory: No
Quantity: Zero or more.

The image overlay box locates one or more input images in a given layering order within a larger canvas. The input images are listed in the order they are layered, i.e., the bottom-most input image first and the top-most input image last, in the SingleItemTypeReferenceBox of type 'dimg' for the derived image item that includes or references this box as property. There shall be only one such box assigned as property of an image item.

The syntax of this box is defined as follows:

```
aligned(8) class ImageOverlay extends FullBox('iovl', version, flags){
    for (j=0; j<4; j++) {
        unsigned int(16) canvas_fill_value;
    }
    FieldLength = ((flags & 1) + 1) * 16;
    unsigned int(FieldLength) output_width;
    unsigned int(FieldLength) output_height;
    for (i=0; i<reference_count; i++) {
        signed int(FieldLength) horizontal_offset;
        signed int(FieldLength) vertical_offset;
    }
}
```

With the following attribute semantics:
version shall be equal to 0.
(flags & 1) equal to 0 specifies that the length of the fields output_width, output_height, horizontal_offset, and vertical_offset is 16 bits. (flags & 1) equal to 1 specifies that the length of the fields output_width, output_height, horizontal_offset, and vertical_offset is 32 bits. The values of flags greater than 1 are reserved.
canvas_fill_value: indicates the pixel value per channels used if no pixel of any input image is located at a particular pixel location. The fill values are specified as RGBA (R, G, B, and A corresponding to loop counter j equal to 0, 1, 2, and 3, respectively). The RGB values are in the sRGB color space as defined in IEC 61966-2-1. The A value is a linear opacity value ranging from 0 (fully transparent) to 65535 (fully opaque).
output_width, output_height: Specify the width and height, respectively, of the output image on which the input images are placed. The image area of the output image is referred to as the canvas.
reference_count is obtained from the SingleItemTypeReferenceBox of type 'dimg' where the item using this box is identified by the from_item_ID field.
horizontal_offset, vertical_offset: Specifies the offset, from the top-left corner of the canvas, to which the input image is located. Pixel locations with a negative offset value are not included in the output image. Horizontal pixel locations greater than or equal to output_width are not included in the output image. Vertical pixel locations greater than or equal to output_height are not included in the output image.

The prescriptive meta-data for image grid is defined as follows:

Box Type: 'grid'
Container: SharedItemProperties
Mandatory: No
Quantity: Zero or more.

The image grid box forms an output image from one or more input images in a given grid order within a larger canvas. There shall be only one such box assigned as property of an image item. The input images are inserted in row-major order, top-row first, left to right, in the order of SingleItemTypeReferenceBox of type 'dimg' for the derived image item using this box within the ItemReferenceBox. There shall be rows*columns item references from this item to the input images. All input images shall have exactly the same width and height; call those tile_width and tile_height. The tiled input images shall completely "cover" the output image grid canvas, where tile_width*columns is greater than or equal to output_width and tile_height*rows is greater than or equal to output_height. The output image is formed by tiling the input images into a grid with a column width (potentially excluding the right-most column) equal to tile_width and a row height (potentially excluding the bottom-most row) equal to tile_height, without gap or overlap, and then trimming on the right and the bottom to the indicated output_width and output_height.

The syntax of this box is defined as follows:

```
aligned(8) class ImageGridBox extends FullBox('grid', version, flags) {
    FieldLength = ((flags & 1) + 1) * 16;
    unsigned int(8) rows;
    unsigned int(8) columns;
    unsigned int(FieldLength) output_width;
    unsigned int(FieldLength) output_height;
}
```

With the following attribute semantics:
version shall be equal to 0.
(flags & 1) equal to 0 specifies that the length of the fields output_width, output_height, is 16 bits. (flags & 1) equal to 1 specifies that the length of the fields output_width, output_height, is 32 bits. The values of flags greater than 1 are reserved.
output_width, output_height: Specify the width and height, respectively, of the output image on which the input images are placed. The image area of the output image is referred to as the canvas.
rows, columns: Specify the number of rows of input images, and the number of input images per row. Input images populate the top row first, followed by the second and following, in the order of item references.

Similarly all other prescriptive and descriptive meta-data, such as the auxiliary configuration box ('auxC'), the image spatial extents box ('ispe'), the pixel information box ('pixi'), the relative location box ('rloc'), the clean aperture box ('clap') (no restrictive list), are all inherited from ISOBMFF fullbox.

According to this embodiment, an item is a derived image, when it includes a 'dimg' item reference to one or more other image items, which are inputs to the derivation. A derived image is obtained by performing a specified operation, such as rotation, to specified input images. The operation performed to obtain the derived image is identified by the item_type of the item. The image items used as input to a derived image may be coded images or they may be other derived image items.

For instance, the clean aperture derived image item is identified by the item_type value 'clap'. It stores no data and shall not have an associated entry in the 'iloc' table. It shall include or reference an item property of type CleanApertureBox as defined in ISO/IEC 14496-12. It shall have an item reference of type 'dimg' to an image item. As another example, the image rotation derived image item is identified by the item_type value 'irot'. It has no data and shall not have an associated entry in the 'iloc' table. It shall include or reference an item property of type ImageRotationBox as defined above. It shall have an item reference of type 'dimg' to an image item.

Similarly, the image overlay derived image item is identified by the item_type 'iovl'. It has no data and shall not have an associated entry in the 'iloc' table. It shall include or reference an item property of type ImageOverlayBox as defined above. It shall have an item reference of type ' dimg' to a set of image items. The image grid derived image item is identified by the item_type value 'grid'. It has no data and shall not have an associated entry in the 'iloc' table. It shall include or reference an item property of type ImageGridBox as defined above. It shall have an item reference of type ' dimg' to a set of image items.

Below are some examples that demonstrate the use of SharedItemProperties box and extended ItemInfoEntry box to assign descriptive and prescriptive meta-data (or properties) to images.

In following example, two property boxes ('hvcC' and 'ispe') are assigned to an image item directly within the associated itemInfoEntry in the array item_properties:

```
FileTypeBox: major-brand = 'heic', compatible-brands = 'heic'
MetaBox: (container)
    HandlerBox: hdlr = 'pict'
    PrimaryItemBox: itemID = 1;
    ItemInfoBox:
        1)  item_type = 'hvc1', itemID=1,
            item_protection_index = 0 (unused), item properties:
            'hvcC', 'ispe'
    ItemLocationBox:
        itemID = 1, extent_count = 1, extent_offset = X,
extent_length = Y; MediaDataBox:
    HEVC Image (at file offset X, with length Y)
```

In following example, in addition to previous example, an image rotation operator (Iron is assigned to the image item in a similar manner:

```
FileTypeBox:  major-brand = 'heic', compatible-brands = 'heic'
MetaBox: (container)
    HandlerBox: hdlr = 'pict'
    PrimaryItemBox: itemID = 1;
    ItemInfoBox:
        1)  item type = 'hvc1', itemID=1,
            item_protection_index = 0 (unused), item properties:
            'hvcC', 'ispe', 'irot'
    ItemLocationBox:
        itemID = 1, extent_count = 1, extent_offset = X,
extent_length = Y; MediaDataBox:
    HEVC Image (at file offset X, with length Y)
```

In following example, multiple images with different HEVC configurations share same dimensions described in a common image spatial extents box ('ispe') stored into the SharedItemProperty box ('sitp'). Each image itemInfoEntry box contains its own HEVC configuration box ('hvcC') and uses an index (item properties indice) to the SharedItemProperty box to reference the common image spatial extents box ('ispe'):

```
FileTypeBox:    major-brand = 'heic', compatible-brands = 'heic'
MetaBox: (container)
    HandlerBox:     hdlr = 'pict'
    PrimaryItemBox: itemID = 1;
    ItemInfoBox:
        1)          item_type = 'hvc1', itemID=1,
                    item_protection_index = 0 (unused),
                    item_properties: 'hvcC', item properties indices: 0
        2)          item_type = 'hvc1', itemID=2,
                    item_protection_index = 0 (unused)
                    item_properties: 'hvcC', item properties indices: 0
        3)          item_type = 'hvc1', itemID=3,
                    item_protection_index = 0 (unused)
                    item_properties: 'hvcC', item properties indices: 0
        4)          item_type = 'hvc1', itemID=4,
                    item_protection_index = 0 (unused)
                    item properties: 'hvcC', item properties indices: 0
    SharedItemPropertiesBox:
        0) 'ispe'
    ItemLocationBox:
        itemID = 1, extent_count = 1, extent_offset = X,
            extent_length = Y;
        itemID = 2, extent_count = 1, extent_offset = P0,
            extent_length = Q0;
        itemID = 3, extent_count = 1, extent_offset = P1,
            extent_length = Q1;
        itemID = 4, extent_count = 1, extent_offset = P2,
            extent_length = Q2;
    MediaDataBox:
    HEVC Image (at file offset X, with length Y)
    HEVC Image (at file offset P1, with length Q1)
    HEVC Image (at file offset P2, with length Q2)
    HEVC Image (at file offset P3, with length Q3)
```

The entries of the table item properties indices form a set of identifiers. Another set of identifier is formed by the rank of the image description information (here 'ispe') in the dedicated shared box [SharedItemPropertiesBox] here "0).

In another embodiment, the other identifier may be formed by another ID allocated to an image description information in the dedicated shared box. For instance, this another ID allocated to an image description information can be defined by inheriting from "VirtualItemBox" (described above) instead of ISOBMFF "fullbox". This embodiment allows advantageously to re-order the image description information in the dedicated shared box without impacting the set identifier.

Both set of identifiers form a structure for linking the image item information [represented by an entry in ItemInfoBox] to at least one image description information.

Following example describes a derived image composed of multiple images in a rotated grid. All images composing the grid share same HEVC configuration and same image dimensions via the 'hvcC' and 'ispe' boxes located into the SharedItemProperty box and referenced via the box property index. The derived image representing the grid is described via an itemInfoEntry containing an image grid box. The rotation to apply is described with an image rotation box associated to the derived image. Input images to compose the derived image are referenced via an item reference entry in item reference box ('iref') box:

```
FileTypeBox:    major-brand = 'heic', compatible-brands = 'heic'
MetaBox: (container)
    HandlerBox:     hdlr = 'pict'
    PrimaryItemBox: itemID = 5;
    ItemInfoBox:
        1)          item_type = 'hvc1', itemID=1,
                    item_protection_index = 0 (unused),
                    item properties indices: 0, 1
```

```
        2)    item_type = 'hvc1', itemID=2,
              item_protection_index = 0 (unused),
              item properties indices: 0, 1
        3)    item_type = 'hvc1', itemID=3,
              item_protection_index = 0 (unused),
              item properties indices: 0, 1
        4)    item_type = 'hvc1', itemID=4,
              item_ protection_index = 0 (unused),
              item properties indices: 0, 1
        5)    item_type = 'grid', itemID=5,
              item_protection_index = 0 (unused),
              item properties: 'grid', 'irot'
    SharedItemPropertiesBox:
        0) 'hvcC'
        1) 'ispe'
    ItemLocationBox:
        itemID = 1, extent_count = 1, extent_offset = X,
            extent_length = Y;
        itemID = 2, extent_count = 1, extent_offset = P0,
            extent_length = Q0;
        itemID = 3, extent_count = 1, extent_offset = P1,
            extent_length = Q1;
        itemID = 4, extent_count = 1, extent_offset = P2,
            extent_length = Q2;
    ItemReferenceBox:
        type='dimg', fromID=5, toID=1,2,3,4;
    MediaDataBox:
        HEVC Image (at file offset X, with length Y)
        HEVC Image (at file offset P1, with length Q1)
        HEVC Image (at file offset P2, with length Q2)
        HEVC Image (at file offset P3, with length Q3)
```

Following example describes an HEVC tiled image. In this example all items (full-image (itemID=1) and tiles (itemID=2, 3, 4, 5)) share the same HEVC configuration box and all tiles share the same image spatial extents box defining the tile size (Wt, Ht) via the SharedItemPropertiesBox. In addition all tile items contains its own relative location box ('rloc') providing the x,y-coordinates of each tile:

```
FileTypeBox:    major-brand = 'heic', compatible-brands = 'heic
MetaBox: (container)
    HandlerBox:    hdlr = 'pict'
    PrimaryItemBox: itemID = 1;
    ItemInfoBox:
        1)    item_type = 'hvc1', itemID=1,
              item_protection_index = 0 (unused),
              item properties indices: 0
              item properties: 'ispe' (W,H)
        2)    item_type = 'hvt1', itemID=2,
              item_protection_index = 0 (unused)
              item properties indices: 0, 1
              item properties: 'rloc'
        3)    item_type = 'hvt1', itemID=3,
              item_protection_index = 0 (unused)
              item properties indices: 0, 1
              item properties: 'rloc'
        4)    item_type = 'hvt1', itemID=4,
              item_protection_index = 0 (unused)
              item properties indices: 0, 1
              item properties: 'rloc'
        5)    item_type = 'hvt1', itemID=5,
              item_protection_index = 0 (unused)
              item properties indices: 0, 1
              item properties: 'rloc'
    SharedItemPropertiesBox:
        0) 'hvcC'
        1) 'ispe' (Wt, Ht)
    ItemLocationBox:
        itemID = 1, extent_count=1, extent_offset=X,
            extent_length=Q0+Q1+Q2+Q3;
        itemID = 2, extent_count=1, extent_offset=X,
            extent_length=Q0;
        itemID = 3, extent_count=1, extent_offset=X+Q0,
            extent_length=Q1;
        itemID = 4, extent_count=1, extent_offset=X+Q0+Q1,
            extent_length=Q2;
        itemID = 5, extent_count=1, extent_offset=X+Q0+Q1+Q2
            extent_length=Q3;
    ItemReferenceBox:
        type='tbas', fromID=2, toID=1;
        type='tbas', fromID=3, toID=1;
        type='tbas', fromID=4, toID=1;
        type='tbas', fromID=5, toID=1;
MediaDataBox:
    HEVC Image (at file offset X, with length Q0+Q1+Q2+Q3)
```

In addition, some image formats require initialization data for decoding image item data. The initialization data is codec-specific and can be the same as or similar to the decoder configuration record specified for video tracks. In such a case, it is useful to share initialization data rather than repeat it in the file format. If such initialization data is needed, it is provided in the item information by a descriptive meta-data (property) of a specific type. Several image items may share the same such property. In order to allow sharing the same initialization data between an image item and some samples of a track, a new descriptive meta-data box called SampleDescriptionEntryReference ('sder') is defined as follows:

Box Type: 'sder'
Container: SharedItemProperties
Mandatory: No
Quantity: Zero or more.

The SampleDescriptionEntryReferenceBox allows indicating that an image item reuses the same initialization data as some samples of a track. It identifies the track and the sample description entry of those samples of that track. This box has the following syntax:

```
aligned(8) class SampleDescriptionEntryReferenceBox
    extends FullBox('sder', 0, flags) {
        unsigned int(32) track_ID;
        unsigned int(32) sample_description_index;
}
```

With following semantics for its parameters:

track_ID: The identifier of the track from which the initialization is reused.

sample_description_index: 1-based index of the sample entry in the associated track that describes the data in this item.

Following example demonstrates the sharing of HEVC configuration between a track and an image item via a SampleDescriptionEntryReference box ('sder') associated to the image itemInfoEntry:

```
FileTypeBox: major-brand = 'heic', compatible-brands = 'heic, mp41'
MetaBox: (container)
    HandlerBox: hdlr = 'pict'
    PrimaryItemBox: itemID = 1;
    ItemInfoBox:
        1)    item_type = 'hvc1', itemID=1, item_protection_index = 0
              (unused), item properties: 'sder' (track: 1,
              sample_desc_index: 1), 'ispe'
    ItemLocationBox:
        itemID = 1, extent_count = 1, extent_offset = X,
            extent_length = Y;
Movie Box: (container)
    Movie header, tracks
    (including track 1 with at least 1 sample desc),
    etc. as required by MP4
```

-continued

```
MediaDataBox:
    HEVC Image (at file offset X, with length Y)
    Media data as needed by the movie
    (some may be shared with the image data)
```

When image item data represent HEVC tiles, then each HEVC tile item shall include or reference a property of type HEVCConfigurationBox with all parameter sets required for decoding the tiles present in the HEVC tile item. Several HEVC tile items may share the same HEVCConfigurationBox property. An HEVC tile item shall also include or reference a RelativeLocationBox property ('rloc') indicating the position of the HEVC tile item within the respective HEVC image item. Several HEVC tile items corresponding to tiles belonging to different HEVC images may share the same RelativeLocationBox. An ImageSpatialExtentsBox property ('ispe') shall be used for each HEVC tile item. The display_width and display_height of the ImageSpatialExtentsBox shall be set to the width and height of the HEVC tile item, In a variant to above alternative embodiment, rather than grouping all shared descriptive and prescriptive meta-data into one single container SharedItemPropertiesBox, two different container boxes can be defined, one dedicated to descriptive meta-data and the other one dedicated to prescriptive meta-data. In such a case, the extended ItemInfoEntry contains two different property index arrays (box_prop_idx and box_ope_idx), or a type of the meta-data (descriptive or prescriptive) is associated to each entry of the property index array (box_prop_idx) to retrieve the associated container.

The entries of box_prop_idx and box_ope_idx form set of identifiers. Other set of identifiers are formed by the rank of the image description information in the two dedicated shared boxes.

In another embodiment, the other set of identifiers may be formed by other IDs allocated to an image description information in each dedicated shared boxes. This embodiment allows advantageously to re-order the image description information in the dedicated shared box without impacting the set of identifiers.

Both set of identifiers form a structure for linking the image item information [represented by an entry in ItemInfoBox] to at least one image description information.

Further examples of this last aspect of the invention are described in the Annex.

In another aspect of the invention, all descriptive and prescriptive meta-data can still be grouped into one or two boxes similar to SharedItemPropertiesBox, but rather than modifying the itemInfoEntry box, the item reference box can be used to associate image items with their descriptive and prescriptive metadata. In this alternative embodiment, two different container boxes are defined, one for descriptive properties (e.g. SharedItemProperties) and the other one for prescriptive properties (e.g. SharedItemOperators):

```
    aligned(8) class SharedItemPropertiesBox extends
Box('sitp') {
        // one or more boxes
    }
    aligned(8) class SharedItemOperatorsBox extends
Box('sito') {
        // one or more boxes
    }
```

Instead of modifying the 'infe' box, the itemReferenceBox 'iref' box is used to associate image and derived image items to their descriptive meta-data and prescriptive meta-data (also called operators).

Two new reference types are defined: for instance, 'sipr' for descriptive meta-data and 'sior' for prescriptive meta-data.

Depending on the relation type ('sipr' or 'sior'), the 'to_item_ID' parameter in the item reference box is interpreted as being an index into respectively the Shared ItemPropertiesBox or the Shared ItemOperatorsBox. The reference types (here 'sipr' or 'sior') associated to the 'to_item_ID' form a structure for linking the image item information (represented by an entry in the ItemInfoBox) to the image description information (descriptive meta-data and prescriptive meta-data).

For any other existing reference types, the attribute 'to_item_ID' is still interpreted as pointing to an itemID in the ItemInfoBox.

Below is an example using 'sipr' and 'sior' relation types to describe multiple Images in a rotated grid:

```
FileTypeBox: major-brand = 'heic', compatible-brands = 'heic'
MetaBox: (container)
    HandlerBox: hdlr = 'pict'
    PrimaryItemBox: itemID = 5;
    ItemInfoBox:
        1)              item_type = 'hvc1', itemID=1,
                        item_protection_index = 0 (unused)
        2)              item_type = 'hvc1', itemID=2,
                        item_protection_index = 0 (unused)
        3)              item_type = 'hvc1', itemID=3,
                        item_protection_index = 0 (unused)
        4)              item_type = 'hvc1', itemID=4,
                        item_protection_index = 0 (unused)
        5)              item_type = 'grid', itemID=5,
                        item_protection_index = 0 (unused)
    SharedItemPropertiesBox:
        0) 'hvcC'
        1) 'ispe'
    SharedItemOperatorsBox:
        0) 'irot'
        1) 'grid'
    ItemLocationBox:
        itemID = 1,       extent_count = 1,
                          extent_offset = X, extent_length = Y;
        itemID = 2,       extent_count = 1,
                          extent_offset = P0, extent_length = Q0;
        itemID = 3,       extent_count = 1,
                          extent_offset = P1, extent_length = Q1;
        itemID = 4,       extent_count = 1,
                          extent_offset = P2, extent_length = Q2;
    ItemReferenceBox:
        type='sipr',      fromID=1, toID=0,1;
        type='sipr',      fromID=2, toID=0,1;
        type='sipr',      fromID=3, toID=0,1;
        type='sipr',      fromID=4, toID=0,1;
        type='dimg',      fromID=5, toID=1,2,3,4;
        type='sior',      fromID=5, toID=1,0;
    MediaDataBox:
    HEVC Image (at file offset X, with length Y)
    HEVC Image (at file offset P1, with length Q1)
    HEVC Image (at file offset P2, with length Q2)
    HEVC Image (at file offset P3, with length Q3)
```

As a variant, each image description information in the shared boxes are associated to a proper ID. This embodiment allows advantageously to re-order the image description information in the dedicated shared box without impacting the identifier.

In a variant, each existing reference type is implicitly associated to either the itemInfoBox, the SharedItemProperties box or the Shared ItemOperators box. For instance, reference types of descriptive meta-data, such as 'ispe', 'rloc', 'clap' or 'hvcC' are associated with SharedItemProperties box, and reference types of prescriptive meta-data such as 'irot', 'iovl', 'grid' are associated with SharedItemOperators box.

Figure 9:
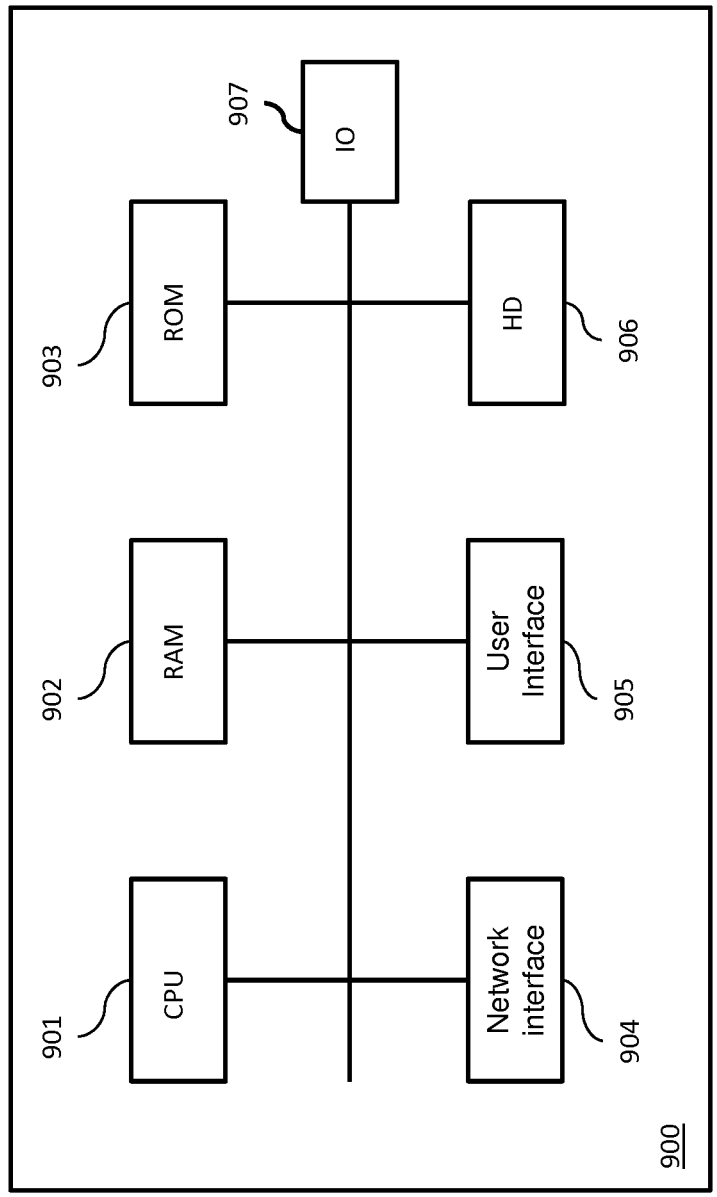
FIG. 9 is a schematic block diagram of a computing device for implementation of one or more embodiments of the invention.

FIG. 9 is a schematic block diagram of a computing device 900 for implementation of one or more embodiments of the invention. The computing device 900 may be a device such as a micro-computer, a workstation or a light portable device. The computing device 900 comprises a communication bus connected to:
- a central processing unit 901, such as a microprocessor, denoted CPU;
- a random access memory 902, denoted RAM, for storing the executable code of the method of embodiments of the invention as well as the registers adapted to record variables and parameters necessary for implementing the method for reading and writing the manifests and/or for encoding the video and/or for reading or generating the Data under a given file format, the memory capacity thereof can be expanded by an optional RAM connected to an expansion port for example;
- a read only memory 903, denoted ROM, for storing computer programs for implementing embodiments of the invention;
- a network interface 904 is typically connected to a communication network over which digital data to be processed are transmitted or received. The network interface 904 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 901;
- a user interface 9805 for receiving inputs from a user or to display information to a user;
- a hard disk 906 denoted HD
- an I/O module 907 for receiving/sending data from/to external devices such as a video source or display The executable code may be stored either in read only memory 903, on the hard disk 906 or on a removable digital medium such as for example a disk. According to a variant, the executable code of the programs can be received by means of a communication network, via the network interface 904, in order to be stored in one of the storage means of the communication device 900, such as the hard disk 906, before being executed.

The central processing unit 901 is adapted to control and direct the execution of the instructions or portions of software code of the program or programs according to embodiments of the invention, which instructions are stored in one of the aforementioned storage means. After powering on, the CPU 901 is capable of executing instructions from main RAM memory 902 relating to a software application after those instructions have been loaded from the program ROM 903 or the hard-disc (HD) 906 for example. Such a software application, when executed by the CPU 901, causes the steps of a method according to embodiments to be performed.

Alternatively, the present invention may be implemented in hardware (for example, in the form of an Application Specific Integrated Circuit or ASIC).

The present invention may be embedded in a device like a camera, a smartphone or a tablet that acts as a remote controller for a TV, for example to zoom in onto a particular region of interest. It can also be used from the same devices to have personalized browsing experience of the TV program by selecting specific areas of interest. Another usage from these devices by a user is to share with other connected devices some selected sub-parts of his preferred videos. It can also be used in smartphone or tablet to monitor what happened in a specific area of a building put under surveillance provided that the surveillance camera supports the generation part of this invention.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

ANNEX

Example 1: Single Image

```
FileTypeBox: major-brand = 'heic', compatible-brands = 'heic'
MetaBox: (container)
    HandlerBox: hdlr = 'pict'
    PrimaryItemBox: itemID = 1;
    ItemInfoBox:
        1)              item_type = 'hvc1', itemID=1,
                        item_protection_index = 0 (unused),
                        item properties: 'hvcC', 'ispe'
    ItemLocationBox:
        itemID = 1,     extent_count = 1, extent_offset = X,
                        extent_length = Y; MediaDataBox:
    HEVC Image (at file offset X, with length Y)
```

Example 2: Single Image with Rotation

```
FileTypeBox: major-brand = 'heic', compatible-brands = 'heic'
MetaBox: (container)
    HandlerBox: hdlr = 'pict'
    PrimaryItemBox: itemID = 1;
    ItemInfoBox:
        1)              item_type = 'hvc1', itemID=1,
                        item_protection_index = 0 (unused),
                        item properties: 'hvcC', 'ispe', 'irot'
    ItemLocationBox:
        itemID = 1,     extent_count = 1, extent offset = X,
                        extent_length = Y; MediaDataBox:
    HEVC Image (at file offset X, with length Y)
```

Example 3: Single Image with Rotation and Clean Aperture

```
FileTypeBox: major-brand = 'heic', compatible-brands = 'heic'
MetaBox: (container)
   HandlerBox: hdlr = 'pict'
   PrimaryItemBox: itemID = 1;
   ItemInfoBox:
      1)   item_type = 'hvc1', itemID=1, item_protection_index = 0 (unused),
           item properties: 'hvcC', 'ispe', 'clap', 'irot'
   ItemLocationBox:
      itemID = 1, extent_count = 1, extent_offset = X, extent_length = Y;
MediaDataBox:
   HEVC Image (at file offset X, with length Y)
```

Example 4: Multiple Images with the Same Dimensions but Different HEVC Configurations

```
FileTypeBox: major-brand = 'heic', compatible-brands = 'heic'
MetaBox: (container)
   HandlerBox: hdlr = 'pict'
   PrimaryItemBox: itemID = 1;
   ItemInfoBox:
      1)             item_type = 'hvc1', itemID=1,
                     item_protection_index = 0 (unused),
                     item properties: 'hvcC'
                     item properties indices: 0
      2)             item_type = 'hvc1', itemID=2,
                     item_protection_index = 0 (unused)
                     item properties: 'hvcC'
                     item properties indices: 0
      3)             item_type = 'hvc1', itemID=3,
                     item_protection_index = 0 (unused)
                     item properties: 'hvcC'
                     item properties indices: 0
      4)             item_type = 'hvc1', itemID=4,
                     item_protection_index = 0 (unused)
                     item properties: 'hvcC'
                     item properties indices: 0
   SharedItemPropertiesBox:
      0)             'ispe'
   ItemLocationBox:
      itemID = 1,    extent_count = 1, extent_offset = X,
                     extent_length = Y;
      itemID = 2,    extent_count = 1, extent_offset = P0,
                     extent_length = Q0;
      itemID = 3,    extent_count = 1, extent_offset = P1,
                     extent_length = Q1;
      itemID = 4,    extent_count = 1, extent_offset = P2,
                     extent_length = Q2; MediaDataBox:
   HEVC Image (at file offset X, with length Y)
   HEVC Image (at file offset P1, with length Q1)
   HEVC Image (at file offset P2, with length Q2)
   HEVC Image (at file offset P3, with length Q3)
```

Example 5: Multiple Images with the Same HEVC Configuration and Dimensions

```
FileTypeBox: major-brand = 'heic', compatible-brands = 'heic'
MetaBox: (container)
   HandlerBox: hdlr = 'pict'
   PrimaryItemBox: itemID = 1;
   ItemInfoBox:
      1)             item_type = 'hvc1', itemID=1,
                     item_protection_index = 0 (unused),
                     item properties indices: 0, 1
      2)             item_type = 'hvc1', itemID=2,
                     item_protection_index = 0 (unused)
                     item properties indices: 0, 1
      3)             item_type = 'hvc1', itemID=3,
                     item_protection_index = 0 (unused)
                     item properties indices: 0, 1
      4)             item_type = 'hvc1', itemID=4,
                     item_protection_index = 0 (unused)
                     item properties indices: 0, 1
   SharedItemPropertiesBox:
      0)             'hvcC'
      1)             'ispe'
   ItemLocationBox:
      itemID = 1,    extent_count = 1, extent_offset = X,
                     extent_length = Y;
      itemID = 2,    extent_count = 1, extent_offset = P0,
                     extent_length = Q0;
      itemID = 3,    extent_count = 1, extent_offset = P1,
                     extent_length = Q1;
      itemID = 4,    extent_count = 1, extent_offset = P2,
                     extent_length = Q2; MediaDataBox:
   HEVC Image (at file offset X, with length Y)
   HEVC Image (at file offset P1, with length Q1)
   HEVC Image (at file offset P2, with length Q2)
   HEVC Image (at file offset P3, with length Q3)
```

Example 6: Multiple Images with the Same HEVC Configuration and Dimensions but Different Rotations

```
FileTypeBox: major-brand = 'heic', compatible-brands = 'heic'
MetaBox: (container)
   HandlerBox: hdlr = 'pict'
   PrimaryItemBox: itemID = 1;
   ItemInfoBox:
      1)             item_type = 'hvc1', itemID=1,
                     item_protection_index = 0 (unused),
                     item properties: 'irot'
                     item properties indices: 0, 1
      2)             item_type = 'hvc1', itemID=2,
                     item_protection_index = 0 (unused)
                     item properties: 'irot'
                     item properties indices: 0, 1
      3)             item_type = 'hvc1', itemID=3,
                     item_protection_index = 0 (unused)
                     item properties: 'irot'
                     item properties indices: 0, 1
      4)             item_type = 'hvc1', itemID=4,
                     item_protection_index = 0 (unused)
                     item properties: 'irot'
                     item properties indices: 0, 1
   SharedItemPropertiesBox:
      0)             'hvcC'
      1)             'ispe'
   ItemLocationBox:
      itemID = 1,    extent_count = 1, extent_offset = X,
                     extent_length = Y;
      itemID = 2,    extent_count = 1, extent_offset = P0,
                     extent_length = Q0;
      itemID = 3,    extent_count = 1, extent_offset = P1,
                     extent_length = Q1;
      itemID = 4,    extent_count = 1, extent_offset = P2,
                     extent_length = Q2; MediaDataBox:
   HEVC Image (at file offset X, with length Y)
   HEVC Image (at file offset P1, with length Q1)
   HEVC Image (at file offset P2, with length Q2)
   HEVC Image (at file offset P3, with length Q3)
```

Example 7: Multiple Images in a Grid

```
FileTypeBox: major-brand = 'heic', compatible-brands = 'heic'
MetaBox: (container)
   HandlerBox: hdlr = 'pict'
   PrimaryItemBox: itemID = 5;
   ItemInfoBox:
      1)                    item_type = 'hvc1', itemID=1,
                            item_protection_index = 0 (unused),
                            item properties indices: 0, 1
      2)                    item_type = 'hvc1', itemID=2,
                            item_protection_index = 0 (unused)
                            item properties indices: 0, 1
      3)                    item_type = 'hvc1', itemID=3,
                            item_protection_index = 0 (unused)
                            item properties indices: 0, 1
      4)                    item_type = 'hvc1', itemID=4,
                            item_protection_index = 0 (unused)
                            item properties indices: 0, 1
      5)                    item_type = 'grid', itemID=5,
                            item_protection_index = 0 (unused)
                            item properties: 'grid'
   SharedItemPropertiesBox:
      0)                    'hvcC'
      1)                    'ispe'
   ItemLocationBox:
      itemID = 1,           extent_count = 1, extent_offset = X,
                            extent_length = Y;
      itemID = 2,           extent_count = 1, extent_offset = P0,
                            extent_length = Q0;
      itemID = 3,           extent_count = 1, extent_offset = P1,
                            extent_length = Q1;
      itemID = 4,           extent_count = 1, extent_offset = P2,
                            extent_length = Q2;
   ItemReferenceBox:
      type='dimg', fromID=5, toID=1,2,3,4;
   MediaDataBox:
      HEVC Image (at file offset X, with length Y)
      HEVC Image (at file offset P1, with length Q1)
      HEVC Image (at file offset P2, with length Q2)
      HEVC Image (at file offset P3, with length Q3)
```

Example 8: Multiple Images in a Rotated Grid

```
FileTypeBox: major-brand = 'heic', compatible-brands = heic'
MetaBox: (container)
   HandlerBox: hdlr = 'pict'
   PrimaryItemBox: itemID = 5;
   ItemInfoBox:
      1)                    item_type = 'hvc1', itemID=1,
                            item_protection_index = 0 (unused),
                            item properties indices: 0, 1
      2)                    item_type = 'hvc1', itemID=2,
                            item_protection_index = 0 (unused)
                            item properties indices: 0, 1
      3)                    item_type = 'hvc1', itemID=3,
                            item_protection_index = 0 (unused)
                            item properties indices: 0, 1
      4)                    item_type = 'hvc1', itemID=4,
                            item_protection_index = 0 (unused)
                            item properties indices: 0, 1
      5)                    item_type = 'grid', itemID=5,
                            item_protection_index = 0 (unused)
                            item properties: 'grid', 'irot'
   SharedItemPropertiesBox:
      0)                    'hvcC'
      1)                    'ispe'
   ItemLocationBox:
      itemID = 1,           extent_count = 1, extent_offset = X,
                            extent_length = Y;
      itemID = 2,           extent_count = 1, extent_offset = P0,
                            extent_length = Q0;
      itemID = 3,           extent_count = 1, extent_offset = P1,
                            extent_length = Q1;
      itemID = 4,           extent_count = 1, extent_offset = P2,
                            extent_length = Q2;
   ItemReferenceBox:
      type='dimg', fromID=5, toID=1,2,3,4;
   MediaDataBox:
      HEVC Image (at file offset X, with length Y)
      HEVC Image (at file offset P1, with length Q1)
      HEVC Image (at file offset P2, with length Q2)
      HEVC Image (at file offset P3, with length Q3)
```

Example 9: Multiple Images with Overlay

```
FileTypeBox: major-brand = 'heic', compatible-brands = 'heic'
MetaBox: (container)
   HandlerBox: hdlr = 'pict'
   PrimaryItemBox: itemID = 3;
   ItemInfoBox:
      1)                    item_type = 'hvc1', itemID=1,
                            item_protection_index = 0 (unused),
                            item properties indices: 0, 1
      2)                    item_type = 'hvc1', itemID=2,
                            item_protection_index = 0 (unused)
                            item properties indices: 0, 1
      3)                    item_type = 'iovl', itemID=3,
                            item_protection_index = 0 (unused)
                            item properties: 'iovl'
   SharedItemPropertiesBox:
      0)                    'hvcC'
      1)                    'ispe'
   ItemLocationBox:
      itemID = 1,           extent_count = 1, extent_offset = X,
                            extent_length = Y;
      itemID = 2,           extent_count = 1, extent_offset = P0,
                            extent_length = Q0;
   ItemReferenceBox:
      type='dimg', fromID=3, toID=1,2;
   MediaDataBox:
      HEVC Image (at file offset X, with length Y)
      HEVC Image (at file offset P1, with length Q1)
```

Example 10: One Image and its Rotated Version

```
FileTypeBox: major-brand = 'heic', compatible-brands = 'heic'
MetaBox: (container)
   HandlerBox: hdlr = 'pict'
   PrimaryItemBox: itemID = 3;
   ItemInfoBox:
      1)                    item_type = 'hvc1', itemID=1,
                            item_protection_index = 0 (unused),
                            item properties: 'hvcC', 'ispe'
      2)                    item_type = 'irot', itemID=2,
                            item_protection_index = 0 (unused)
                            item properties: 'irot'
   ItemLocationBox:
      itemID = 1,           extent_count = 1, extent_offset = X,
                            extent_length = Y;
   ItemReferenceBox:
      type='dimg', fromID=2, toID=1;
   MediaDataBox:
      HEVC Image (at file offset X, with length Y)
```

Example 11: Tiled Images

```
FileTypeBox: major-brand = 'heic', compatible-brands ='heic'
MetaBox: (container)
  HandlerBox: hdlr ='pict'
  PrimaryItemBox: itemID = 1;
  ItemInfoBox:
    1)           item_type = 'hvc1', itemID=1,
                 item_protection_index = 0 (unused),
                 item properties indices: 0
                 item properties: 'ispe' (W,H)
    2)           item_type = 'hvt1', itemID=2,
                 item_protection_index = 0 (unused)
                 item properties indices: 0, 1
                 item properties: 'rloc'
    3)           item_type = 'hvt1', itemID=3,
                 item_protection_index = 0 (unused)
                 item properties indices: 0, 1
                 item properties: 'rloc'
    4)           item_type = 'hvt1', itemID=4,
                 item_protection_index = 0 (unused)
                 item properties indices: 0, 1
                 item properties: 'rloc'
    5)           item_type = 'hvt1', itemID=5,
                 item_protection_index = 0 (unused)
                 item properties indices: 0, 1
                 item properties: 'rloc'
  SharedItemPropertiesBox:
    0)           'hvcC'
    1)           'ispe' (Wt, Ht)
  ItemLocationBox:
    itemID = 1,    extent_count=1, extent_offset=X,
                   extent_length=Q0+Q1+Q2+Q3;
    itemID = 2,    extent_count=1, extent_offset=X,
                   extent_length=Q0;
    itemID = 3,    extent_count=1, extent_offset=X+Q0,
                   extent_length=Q1;
    itemID = 4,    extent_count=1, extent_offset=X+Q0+Q1,
                   extent_length=Q2;
    itemID = 4,    extent_count=1, extent_offset=X+Q0+Q1+Q2,
                   extent_length=Q3;
  ItemReferenceBox:
    type='tbas',   fromID=2, toID=1;
    type='tbas',   fromID=3, toID=1;
    type='tbas',   fromID=4, toID=1;
    type='tbas',   fromID=5, toID=1;
MediaDataBox:
  HEVC Image (at file offset X, with length Q0+Q1+Q2+Q3)
```

Example 12: Auxiliary Image with Same HEVC Configuration and Dimensions as the Master Image

```
FileTypeBox: major-brand = 'heic', compatible-brands = 'heic'
MetaBox: (container)
  HandlerBox: hdlr = 'pict'
  PrimaryItemBox: itemID = 1;
  ItemInfoBox:
    1)           item_type = 'hvc1', itemID=1,
                 item_protection_index = 0 (unused),
                 item properties indices: 0, 1
    2)           item_type = 'hvc1', itemID=2,
                 item_protection_index = 0 (unused)
                 item properties indices: 0, 1
                 item properties: 'auxC'
  SharedItemPropertiesBox:
    0)           'hvcC'
    1)           'ispe'
  ItemLocationBox:
    itemID = 1,    extent_count = 1, extent_offset = X,
                   extent_length = Y;
    itemID = 2,    extent_count = 1, extent_offset = P,
                   extent_length = Q;
  ItemReferenceBox:
    type='auxl',   fromID=2, toID=1;
MediaDataBox:
  HEVC Image (at file offset X, with length Y)
  HEVC Image (at file offset P, with length Q)
```

Example 13: Image with Sub-Sample Description

```
FileTypeBox: major-brand = 'heic', compatible-brands = 'heic'
MetaBox: (container)
  HandlerBox: hdlr = 'pict'
  PrimaryItemBox: itemID = 1;
  ItemInfoBox:
    1)           item_type = 'hvc1', itemID=1,
                 item_protection_index = 0 (unused),
                 item properties: 'hvcC', 'ispe', 'subs'
  ItemLocationBox:
    itemID = 1,    extent_count = 1, extent_offset = X,
                   extent_length = Y;
MediaDataBox:
  HEVC Image (at file offset X, with length Y)
```

Example 14: Shared HEVC Configuration Between Track and Item

```
FileTypeBox: major-brand = 'heic', compatible-brands = 'heic, mp41'
MetaBox: (container)
  HandlerBox: hdlr = 'pict'
  PrimaryItemBox: itemID = 1;
  ItemInfoBox:
    1)           item_type = 'hvc1', itemID=1,
                 item_protection_index = 0 (unused),
                 item properties: 'sder' (track: 1, sample_desc_index: 1),
'ispe'
  ItemLocationBox:
    itemID = 1,    extent_count = 1, extent_offset = X,
                   extent_length = Y; Movie Box: (container)
  Movie header, tracks (including track 1 with at least 1 sample
desc), etc. as required by MP4
MediaDataBox:
  HEVC Image (at file offset X, with length Y)
  Media data as needed by the movie (some may be shared with the
  image data)
```

The invention claimed is:

1. A method for generating an image file based on one or more still images, the method comprising:
    obtaining the one or more still images;
    identifying one or more properties relating to each of the one or more still images, and
    generating the image file including at least (i) one or more properties which are identified, the one or more properties being listed in a dedicated box, and (ii) association information for associating identification information of each of the one or more properties and identification information of each of the one or more still images,
    wherein the generated image file includes metadata organized based on a hierarchical structure of boxes, wherein the dedicated box belongs to said hierarchical structure of boxes.

2. The method according to claim 1, wherein the image file further includes an "Item Information Box" for representing information for each of the one or more still images, and the association information for associating the identification information of each of the one or more properties and the identification information of each of the one or more still images is described in a predetermined box different from said dedicated box.

3. The method according to claim 2, wherein the dedicated box comprises at least one or more sub-boxes "ispe", each describing a property comprising a width and a height of the one or more still images, and wherein the association information associates the identification information of each of the one or more still images and the identification information of each of one or more "ispe".

4. The method according to claim 2, wherein the dedicated box comprises one or more sub-boxes "hvcC", each describing a property indicating a decoder configuration for decoding the one or more still images and wherein the association information associates the identification information of each of the one or more still images and the identification information of each of one or more "hvcC".

5. The method according to claim 2, wherein the association information represents correspondence between identification information of one of the one or more properties which are identified and identification information corresponding to at least two images.

6. The method according to claim 1, wherein the image file is generated based on a plurality of still images.

7. The method according to claim 1, wherein the image file is generated based on a plurality of sub-images corresponding to a single still image.

8. The method according to claim 1, wherein the image file comprises a metadata part and a media data part, and wherein both of the one or more properties and the association information are described in the metadata part.

9. The method of claim 1, wherein the identified properties are ordered, the identification information of each of the one or more properties corresponding to its order.

10. The method according to claim 1, wherein a first set of the one or more properties is associated to a first still image, and wherein a second set of the at least one or more properties is associated to a second still image, the first set being different from the second set.

11. The method according to claim 1, wherein the identification information of each of the one or more properties is different from the identification information of each of the one or more still images.

12. The method according to claim 1, wherein the hierarchical structure of boxes is compliant with the ISOBMFF standard.

13. A device for generating an image file based on one or more still images, the device comprising:
   an input module for obtaining the one or more still images;
   an identifier module for identifying one or more properties relating to each of the one or more still images, and
   a generator module for generating the image file including at least (i) one or more properties which are identified, the one or more properties being listed in a dedicated box, and (ii) association information for associating identification information of each of the one or more properties and identification information of each of the one or more still images;
   wherein the generated image file includes metadata organized based on a hierarchical structure of boxes, wherein the dedicated box belongs to said hierarchical structure of boxes.

14. The device of claim 13, wherein the image file further includes an "Item Information Box" for representing information for each of the one or more still images, and the association information for associating the identification information of each of the one or more properties and the identification information of each of the one or more still images is described in a predetermined box different from said dedicated box.

15. The device according to claim 14, wherein the dedicated box comprises one or more sub-boxes "ispe", each describing a property comprising a width and a height of the one or more still images, and wherein the association information associates the identification information of each of the one or more still images and the identification information of each of one or more "ispe".

16. The device according to claim 14, wherein the dedicated box comprises one or more sub-boxes "hvcC", each describing a property indicating a decoder configuration of the one or more still images, and wherein the association information associates the identification information of each of the one or more images and the identification information of each of one or more "hvcC".

17. The device according to claim 14, wherein the association information represents correspondence between identification information of one of the one or more properties which are identified and identification information corresponding to at least two images.

18. The method according to claim 13, wherein the hierarchical structure of boxes is compliant with the ISOBMFF standard.

19. A non-transitory computer-readable storage medium storing instructions of a computer program for implementing a method comprising:
   obtaining the one or more still images;
   identifying one or more properties relating to each of the one or more still images, and
   generating the image file including at least (i) one or more properties which are identified, the one or more properties being listed in a dedicated box, and (ii) association information for associating identification information of each of the one or more properties and identification information of each of the one or more still images, wherein the generated image file includes metadata organized based on a hierarchical structure of boxes, wherein the dedicated box belongs to said hierarchical structure of boxes.

* * * * *